United States Patent
Zhang et al.

(10) Patent No.: US 10,957,026 B1
(45) Date of Patent: Mar. 23, 2021

(54) LEARNING FROM ESTIMATED HIGH-DYNAMIC RANGE ALL WEATHER LIGHTING PARAMETERS

(71) Applicant: ADOBE INC., San Jose, CA (US)

(72) Inventors: Jinsong Zhang, Quebec (CA); Kalyan K. Sunkavalli, San Jose, CA (US); Yannick Hold-Geoffroy, San Jose, CA (US); Sunil Hadap, Dublin, CA (US); Jonathan Eisenmann, San Francisco, CA (US); Jean-Francois Lalonde, Quebec (CA)

(73) Assignee: Adobe Inc., San Jose, CA (US)

(*) Notice: Subject to any disclaimer, the term of this patent is extended or adjusted under 35 U.S.C. 154(b) by 3 days.

(21) Appl. No.: 16/564,398

(22) Filed: Sep. 9, 2019

(51) Int. Cl.
*G06K 9/00* (2006.01)
*G06T 5/00* (2006.01)

(52) U.S. Cl.
CPC .... *G06T 5/009* (2013.01); *G06T 2207/20081* (2013.01); *G06T 2207/20084* (2013.01); *G06T 2207/20208* (2013.01)

(58) Field of Classification Search
CPC .......... G06T 5/009; G06T 2207/20081; G06T 2207/20084; G06T 2207/20208
USPC ....................................................... 382/156
See application file for complete search history.

(56) References Cited

U.S. PATENT DOCUMENTS

| | | | | |
|---|---|---|---|---|
| 10,402,952 B2* | 9/2019 | Baar | | G06T 5/50 |
| 10,475,169 B2* | 11/2019 | Sunkavalli | | G06T 1/0007 |
| 10,607,329 B2* | 3/2020 | Sunkavalli | | G06N 3/0472 |
| 10,609,286 B2* | 3/2020 | Hold-Geoffroy | | G06K 9/6274 |
| 10,665,011 B1* | 5/2020 | Sunkavalli | | G06T 15/80 |
| 10,692,277 B1* | 6/2020 | Sunkavalli | | G06T 15/506 |
| 10,796,419 B2* | 10/2020 | Hwang | | H04N 9/77 |
| 2018/0359416 A1 | 12/2018 | Hold-Geoffroy et al. | | |

OTHER PUBLICATIONS

Zhang, J., Sunkavalli, K., Hold-Geoffroy, Y., Hadap, S., Eisenman, J., & Lalonde, J. F. (Jun. 2019). All-Weather Deep Outdoor Lighting Estimation. In Proceedings of the IEEE Conference on Computer Vision and Pattern Recognition (pp. 10158-10166).
Barron, J. T., & Malik, J. (2014). Shape, illumination, and reflectance from shading. IEEE transactions on pattern analysis and machine intelligence, 37(8), 1670-1687.
Calian, D. A., Lalonde, J. F., Gotardo, P., Simon, T., Matthews, I., & Mitchell, K. (May 2018). From faces to outdoor light probes. In Computer Graphics Forum (vol. 37, No. 2, pp. 51-61).

(Continued)

*Primary Examiner* — Jonathan S Lee
(74) *Attorney, Agent, or Firm* — Shook, Hardy & Bacon L.L.P.

(57) ABSTRACT

Methods and systems are provided for determining high-dynamic range lighting parameters for input low-dynamic range images. A neural network system can be trained to estimate high-dynamic range lighting parameters for input low-dynamic range images. The high-dynamic range lighting parameters can be based on sky color, sky turbidity, sun color, sun shape, and sun position. Such input low-dynamic range images can be low-dynamic range panorama images or low-dynamic range standard images. Such a neural network system can apply the estimates high-dynamic range lighting parameters to objects added to the low-dynamic range images.

20 Claims, 10 Drawing Sheets

(56) References Cited

OTHER PUBLICATIONS

Cheng, D., Shi, J., Chen, Y., Deng, X., & Zhang, X. (Oct. 2018). Learning scene illumination by pairwise photos from rear and front mobile cameras. In Computer Graphics Forum (vol. 37, No. 7, pp. 213-221).
Clevert, D. A., Unterthiner, T., & Hochreiter, S. (2015). Fast and accurate deep network learning by exponential linear units (elus). arXiv preprint arXiv:1511.07289.
Georgoulis, S., Rematas, K., Ritschel, T., Fritz, M., Tuytelaars, T., & Van Gool, L. (2017). What is around the camera?. In Proceedings of the IEEE International Conference on Computer Vision (pp. 5170-5178).
Georgoulis, S., Rematas, K., Ritschel, T., Gavves, E., Fritz, M., Van Gool, L., & Tuytelaars, T. (2017). Reflectance and natural illumination from single-material specular objects using deep learning. IEEE transactions on pattern analysis and machine intelligence, 40(8), 1932-1947.
Grosse, R., Johnson, M. K., Adelson, E. H., & Freeman, W. T. (Sep. 2009). Ground truth dataset and baseline evaluations for intrinsic image algorithms. In 2009 IEEE 12th International Conference on Computer Vision (pp. 2335-2342). IEEE.
Hold-Geoffroy, Y., Athawale, A., & Lalonde, J. F. (2019). Deep sky modeling for single image outdoor lighting estimation. arXiv preprint arXiv:1905.03897.
Hold-Geoffroy, Y., Sunkavalli, K., Hadap, S., Gambaretto, E., & Lalonde, J. F. (2017). Deep outdoor illumination estimation. In Proceedings of the IEEE Conference on Computer Vision and Pattern Recognition (pp. 7312-7321).
Hosek, L., & Wilkie, A. (2012). An analytic model for full spectral sky-dome radiance. ACM Transactions on Graphics (TOG), 31(4), 95.
Karsch, K., Sunkavalli, K., Hadap, S., Carr, N., Jin, H., Fonte, R., . . . & Forsyth, D. (2014). Automatic scene inference for 3d object compositing. ACM Transactions on Graphics (TOG), 33(3), 32.
Krizhevsky, A., Sutskever, I., & Hinton, G. E. (2012). Imagenet classification with deep convolutional neural networks. In Advances in neural information processing systems (pp. 1097-1105).
Lalonde, J. F., Efros, A. A., & Narasimhan, S. G. (2012). Estimating the natural illumination conditions from a single outdoor image. International Journal of Computer Vision, 98(2), 123-145.
Nimeroff, J. S., Simoncelli, E., & Dorsey, J. (1995). Efficient re-rendering of naturally illuminated environments. In Photorealistic Rendering Techniques (pp. 373-388). Springer, Berlin, Heidelberg.
Perez, R., Seals, R., & Michalsky, J. (1993). All-weather model for sky luminance distribution—preliminary configuration and validation. Solar energy, 50(3), 235-245.
Preetham, A. J., Shirley, P., & Smits, B. (1999). A Practical Analytic Model for Daylight. In Proceedings of the 26th annual conference on Computer graphics and interactive techniques—SIGGRAPH (pp. 91-100).
Rematas, K., Ritschel, T., Fritz, M., Gavves, E., & Tuytelaars, T. (2016). Deep reflectance maps. In Proceedings of the IEEE Conference on Computer Vision and Pattern Recognition (pp. 4508-4516).
Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.
Xiao, J., Ehinger, K. A., Oliva, A., & Torralba, A. (Jun. 2012). Recognizing scene viewpoint using panoramic place representation. In 2012 IEEE Conference on Computer Vision and Pattern Recognition (pp. 2695-2702). IEEE.
Zhang, J., & Lalonde, J. F. (2017). Learning high dynamic range from outdoor panoramas. In Proceedings of the IEEE International Conference on Computer Vision (pp. 4519-4528).
Zhang, Jinsong, and Jean-François Lalonde. "Learning high dynamic range from outdoor panoramas." Proceedings of the IEEE International Conference on Computer Vision. 2017.
Hold-Geoffroy, Yannick, et al. "Deep outdoor illumination estimation." Proceedings of the IEEE Conference on Computer Vision and Pattern Recognition. 2017.
Lalonde, Jean-François, and Iain Matthews. "Lighting estimation in outdoor image collections." 2014 2nd International Conference on 3D Vision. vol. 1. IEEE, 2014.
Lombardi, Stephen, and Ko Nishino. "Reflectance and illumination recovery in the wild." IEEE transactions on pattern analysis and machine intelligence 38.1 (2015): 129-141.
HošekHošek, Lukáš, and Alexander Wilkie. "Adding a solar-radiance function to the hošek-wilkie skylight model." IEEE computer graphics and applications 33.3 (2013): 44-52.
Kider Jr, Joseph T., et al. "A framework for the experimental comparison of solar and skydome illumination." ACM Transactions on Graphics (TOG) 33.6 (2014): 1-12.

* cited by examiner

LEARNING FROM ESTIMATED HIGH-DYNAMIC RANGE ALL WEATHER LIGHTING PARAMETERS

BACKGROUND

When using graphics applications, users often desire to manipulate images by compositing objects into the images or performing scene reconstruction or modeling. Creating realistic results depends on determining accurate lighting related to the original image. In particular, when compositing objects into an image, understanding the lighting conditions in the image is important to ensure that the objects added to the image are illuminated appropriately so the composite looks realistic. Determining lighting, however, is complicated by scene geometry and material properties. Further, outdoor scenes often contain additional complicating factors that affect lighting such as clouds in the sky, exposure, and tone mapping. Conventional methods of determining lighting in outdoor scenes have had limited success in attempting to solve these problems. In particular, conventional methods do not accurately determine lighting for use in scenes when such complicating factors are present (e.g., generating accurate composite images where the sky has clouds).

SUMMARY

Embodiments of the present disclosure are directed towards a lighting estimation system trained to estimate high-dynamic range (HDR) lighting from a single low-dynamic range (LDR) image of an outdoor scene. Such a LDR image can be a panoramic image or a standard image. In accordance with embodiments of the present disclosure, such a system can be created using one or more neural networks. In this regard, the neural networks can be trained to assist in estimating HDR lighting parameters by leveraging the overall attributes of HDR lighting. In particular, the HDR parameters can be based on the Lalonde-Matthews (LM) model. Specifically, the HDR parameters can be LM lighting parameters that include sky color, turbidity, sun color, shape of the sun, and the sun position.

The lighting estimation system can estimate HDR lighting parameters from a single LDR image. In particular, the lighting estimation system can use a panoramic lighting parameter neural network to estimate HDR lighting parameters from a single LDR panoramic image. To run the panoramic lighting parameter neural network, a LDR panorama image can be input into the lighting estimation neural network system. Upon receiving the LDR panorama image, the panoramic lighting parameter neural network can estimate the LM lighting parameters for the LDR panorama image. The panoramic lighting parameter neural network can be used to generate a dataset for training a standard image lighting parameter neural network to estimate HDR lighting parameters from a single LDR standard image. A standard image can be a limited field-of-view image (e.g., when compared to a panorama). The panoramic lighting parameter neural network can be used to obtain estimated LM lighting parameters for a set of LDR panorama images. These estimated LM lighting parameters can be treated as ground-truth parameters for a set of LDR standard images (e.g., generated from the set of LDR panorama images) used to train the standard image lighting parameter neural network. The trained standard image lighting parameter neural network can be used to determine HDR lighting parameters from a single LDR standard image. To run the standard lighting parameter neural network, a LDR standard image can be input into the lighting estimation neural network system. Upon receiving the LDR panorama image, the standard image lighting parameter neural network can estimate the LM lighting parameters for the LDR standard image.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1A:
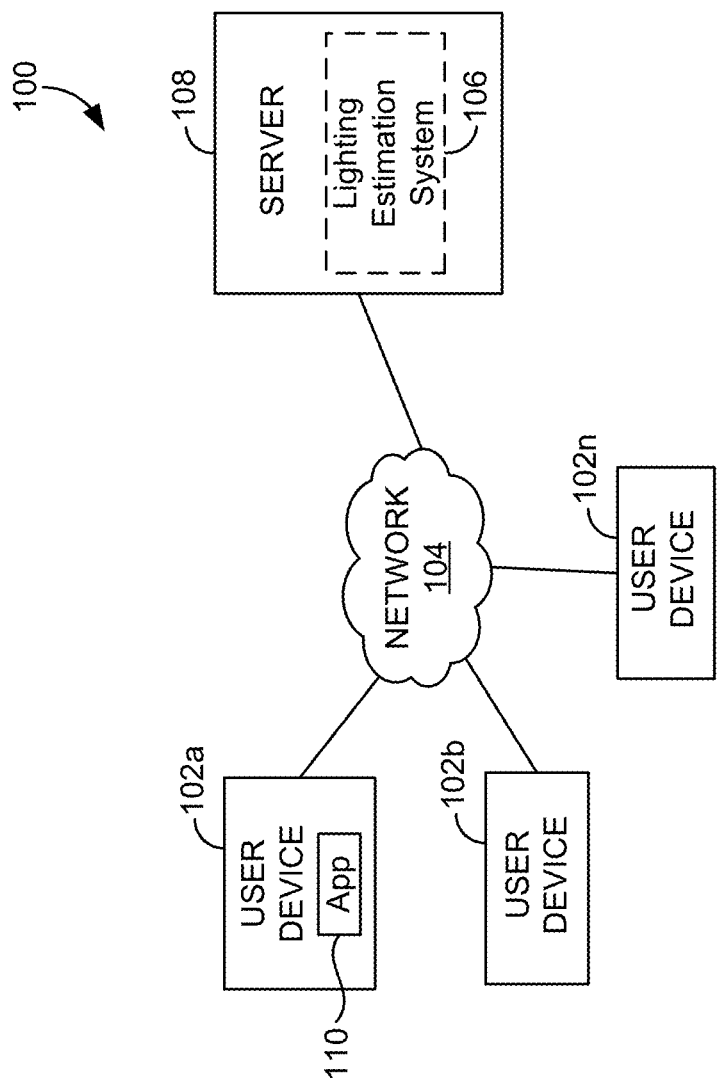
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire to manipulate images, for example, by performing manipulations in image composition, scene reconstruction, and/or three dimensional modeling. To achieve realistic results when compositing an object into an image, the object added to the image should be lighted similarly to the rest of the image (e.g., the shadow casted from the object should match the other shadows in the image). As such, it is important to accurately determine the lighting affecting objects depicted in the original image.

Some conventional systems rely on hand-crafted features extracted from an image to estimate lighting for the image. In particular, contrast and shadows can be determined for the features to try to estimate the lighting. However, this method is quite brittle because the lighting determined from hand-designed features tends to fail in many cases.

Other conventional methods have attempted to determine more detailed lighting information for images to increase lighting accuracy. Such detailed lighting information can be based on the dynamic range of an image. A dynamic range of an image can refer to the range between the brightest and darkest parts of a scene or an image. Images taken with conventional cameras are often low-dynamic range (LDR) images. However, LDR images have a limited range of pixel values. For example, a LDR image has any ratio equal to or less than 255:1. Often, this limited range of pixels in LDR images means that lighting determined from such images cannot be applied to objects added to the image in a manner that accurately reflects the lighting of the scene in the image. High-dynamic range (HDR) images, on the other hand, often contain a broad dynamic range of lighting information for an image. For example, a HDR image may have a pixel range of any ratio higher than 255:1, up to 100,000:1. Because a larger range of pixel values are available in HDR images, lighting determined from such images is much more accurate. Objects added to an image using lighting determined from HDR images can be rendered to accurately imitate the lighting of the overall image. As such, conventional methods have attempted to convert LDR images to HDR images to determine lighting parameters (e.g., HDR lighting parameters) that can be used to more accurately light objects added to the LDR images.

Unlike lighting determined from a LDR image, HDR lighting captures the entire dynamic range of lighting present in an image. For instance, methods based on HDR lighting fit a HDR parametric lighting model to a large-scale dataset of low-dynamic range 360 degree panoramas using pure optimization. This optimization can then be used to label LDR panoramas with HDR parameters. Such conventional methods that use optimization can often take into account sun position, haziness, and intensity. The problem with such conventional optimization methods is that while they are successful at locating the sun in a 360 degree panorama, in general, if the image has any clouds in the sky, the methods are not robust at determining accurate lighting. This leads to erroneous estimates of lighting in images with clouds in the sky. Further, LDR panoramas often have reduced sun intensity values due to the inherent pixel value constraints in a LDR image. Such pixel value constraints impact the ability of the optimization to find good HDR sunlight parameters, regardless of the presence of clouds.

Other methods have attempted to directly predict pixel values for HDR lighting for an entire panorama, for instance, by converting LDR panoramas to HDR panoramas and fitting a parametric lighting mode to the HDR panoramas. However, such methods directly predict pixel values of HDR lighting and focus on determining values for every pixel in the panorama. Predicting values for every pixel is computationally expensive and inefficient. Further, such methods are not able to generate robust estimates of intensity and cloudiness for images with cloudy skies. Such methods do not always determine realistic high-dynamic lighting properties and require significant computational resources.

Attempts have also been made to estimate HDR lighting from LDR panorama images. These approaches have relied on using the Hošek-Wilkie model to represent the sky and sun in making HDR lighting estimations. In such a model, the sky and sun are correlated such that the sky parameters can be fit to a LDR panorama and a HDR sun model can be extrapolated (that can be used to apply HDR lighting parameters to objects added to the image). However, such a model does not always accurately determine lighting in scenes in all lighting conditions (e.g., where the sky has clouds).

Accordingly, embodiments of the present disclosure are directed to a lighting estimation system capable of facilitating more accurate HDR lighting estimation from LDR images. In particular, the lighting estimation system can robustly estimate HDR lighting parameters for a wide variety of outdoor lighting conditions. In addition, the lighting estimation system can estimate HDR lighting parameters from a single LDR panorama image or a single LDR standard image.

To more robustly estimate HDR lighting parameters, the lighting estimation system uses a model that provides more expressive HDR lighting parameters. These more expressive HDR lighting parameters allow for more accurately predicting lighting under a wider set of lighting conditions. Generally, a model can be used by the lighting estimation system to determine HDR lighting parameters. Such a model can represent the sky and sun in an image. In particular, the present disclosure leverages the Lalonde-Matthews sky model ("LM model") to represent the sky and sun in an image. The LM model can represent a wide range of lighting conditions for outdoor scenes (e.g., completely overcast to fully sunny). While the LM model is more expressive than other available models, the LM model is comprised of two uncorrelated components, a sky component (e.g., represented using a LM sky model) and a sun illumination component (e.g., represented using a LM sun model). The sky component can be based on a Preetham sky model multiplied with an average sky color that takes into account the angle between the sky and the sun position as well as sky turbidity. The sun component can take into account the shape of the sun (e.g., from the perspective of the earth) and the color of the sun. Such a model can also take into account atmospheric turbidity and sparse aerosols in the air, as well as simulating smaller and denser occluders like small clouds passing over the sun that affect the effective visible size of the sun.

At a high level, lighting estimations by the lighting estimation system can be determined using a neural network system (e.g., a lighting estimation neural network system). A neural network system can be comprised of one or more neural networks. A neural network is a computational approach loosely based on how the brain solves problems using large clusters of connected neurons. Neural networks are self-learning and trained to generate output reflecting a desired result. As described herein, the lighting estimation neural network system can be trained using at least one neural network (e.g., panoramic lighting parameter neural network, standard image lighting parameter neural network, etc.). In such a system, a first neural network (e.g., panoramic lighting parameter neural network) can be trained to estimate HDR lighting parameters (e.g., based on estimated LM lighting parameters) from an input LDR panorama image (e.g., a 360 degree panorama). Further, in such a system, a second neural network (e.g., standard image lighting parameter neural network) can be trained to determine HDR lighting parameters (e.g., based on determine LM lighting parameters) from an input LDR standard image. Although generally described as two separate neural networks, any number of neural networks can be trained in accordance with embodiments described herein.

By training and utilizing a lighting estimation neural network system in accordance with the systems and methods described herein, the lighting estimation system more accurately estimates HDR lighting for LDR images using the LM lighting parameters. Whereas conventional systems have difficulty predicting lighting for scenes with cloudy skies, the lighting estimation system can accurately estimate HDR lighting parameters that take into consideration how these lighting conditions affect a scene in an image. Determining more accurate estimations of lighting parameters further enables more accurate digital image alterations, better (e.g., more realistic) virtual object rendering, etc. Advantageously, the lighting estimation neural network system can be used to determine HDR lighting for LDR panoramic images and/or LDR standard images.

As mentioned, the lighting estimation neural network system can use a panoramic lighting parameter neural network to estimate HDR lighting parameters from a single LDR panoramic image. In particular, the panoramic lighting parameter neural network can estimate LM lighting parameters for an input LDR panorama image. For instance, a latent representation in the panoramic lighting parameter neural network can be used to estimate the LM lighting parameters. Such LM lighting parameters can include sky color, turbidity, sun color, shape of the sun, and the sun position. To run the panoramic lighting parameter neural network, a LDR panorama image can be input into the lighting estimation neural network system. The panoramic lighting parameter neural network can receive the input LDR panorama image. Upon receiving the LDR panorama image, the panoramic lighting parameter neural network can estimate the LM lighting parameters for the LDR panorama image (e.g., based on a latent representation).

In embodiments, the panoramic lighting parameter neural network can undergo training to learn to estimate the LM lighting parameters for LDR panorama images. During training, a set of LDR panoramic images can be used. For example, the network can be trained using a set of outdoor LDR panoramic images generated from a corresponding set of outdoor HDR panoramic images. The lighting estimation neural network system can use the set of outdoor HDR panoramic images to provide ground-truth information for each of the outdoor LDR panoramic images. For example, the ground-truth information can be used to determine the accuracy of the estimated LM parameters by the panoramic lighting parameter neural network. The ground-truth information can be based on a desired optimal output by the network. In particular, after LM lighting parameters are estimated for an input LDR panorama image, the estimated LM lighting parameters can be compared with a variety of corresponding ground-truth information to determine any error in the panoramic lighting parameter neural network. During training, the lighting estimation system can minimize loss based on the estimated LM lighting parameters as compared to the corresponding ground-truth information such that the network learns to estimate accurate LM lighting parameters.

In more detail, the accuracy of estimated LM lighting parameters can be analyzed to determine error in the panoramic lighting parameter estimate neural network. Error can be based on a variety of losses. Loss can be based on comparing an output from the panoramic lighting parameter neural network with a known ground-truth. In particular, a latent representation in the panoramic lighting parameter neural network can be used to generate an estimated HDR panorama image (having the estimated LM lighting parameters. This estimated HDR panorama image can be compared to a corresponding ground-truth HDR panorama image to calculate loss (e.g., panorama loss). In addition, the estimated sun elevation can be compared with a ground-truth sun elevation to calculate loss (e.g., sun elevation loss).

Further, the estimated LM lighting parameters can be compared with the ground-truth lighting parameters by applying the lighting parameters to a synthetic scene to calculate loss. Such a scene can be a basic three-dimensional scene to which lighting parameters can easily be applied (e.g., a scene of geometric primitives, such as spheres, with varying surface material properties). The scenes can then be compared to determine the accuracy of the estimated LM lighting parameters. This accuracy can indicate errors in the lighting parameter estimate neural network. It is advantageous to use rendered scenes to correct errors in the panoramic lighting parameter neural network because rendering a three-dimensional scene with HDR lighting (e.g., using the LM lighting parameters) is very computationally expensive. Loss can be calculated using rendered scenes based on estimated LM parameters compared to ground-truth rendered scenes. Such rendered scenes can include a rendered scene based on LM sky parameters (e.g., using a LM sky model), a rendered scene based on estimated LM sun parameters (e.g., using a LM sun model), and a rendered scene based on the combination of estimated LM sky parameters and estimated LM sun parameters (e.g., using the combined LM sky model and LM sun model). In addition, estimated LM parameters from the estimated HDR panorama image can be used to render a scene. Errors determined from comparing the scene(s) with estimated LM lighting parameters with the scene(s) with ground-truth lighting parameters can be used to update the panoramic lighting parameter estimate neural network.

In one embodiment, the trained panoramic lighting parameter neural network can be used to generate a dataset for training a standard image lighting parameter neural network to estimate HDR lighting parameters from a single LDR standard image. A standard image can be a limited field-of-view image (e.g., when compared to a panorama). In particular, the trained panoramic lighting parameter neural network can be used to obtain estimated LM lighting parameters for a set of LDR panorama images. These estimated LM lighting parameters can be treated as ground-truth parameters for a set of LDR standard images (e.g., generated from the set of LDR panorama images). The standard image lighting parameter neural network can be trained to estimate HDR lighting parameters from a single LDR standard image is discussed further below.

The lighting estimation neural network system can use a standard image lighting parameter neural network to determine HDR lighting parameters from a single LDR standard image. In particular, the standard image lighting parameter neural network can determine LM lighting parameters for an input LDR standard image. For instance, a latent representation in the standard image lighting parameter neural network can be used to determine the LM lighting parameters. To run the standard image lighting parameter neural network, a LDR standard image can be input into the lighting estimation neural network system. The standard image lighting parameter neural network can receive the input LDR standard image. Upon receiving the LDR standard image, the standard image lighting parameter neural network can determine LM lighting parameters for the LDR standard image (e.g., based on a latent representation). The LM lighting parameters determined by the standard image lighting parameter neural network can include sky color, sky turbidity, sun color, sun shape, and sun position (e.g., the same LM lighting parameters learned by the panoramic lighting parameter neural network).

More particularly, the standard image lighting parameter neural network can undergo training to learn to determine LM lighting parameters for a LDR standard image. During training, the lighting estimation neural network system can train the standard image lighting parameter neural network using a set of LDR standard images. The set of LDR standard images can be generated by cropping a set of outdoor LDR panoramic images (e.g., cropping a LDR panoramic image into seven limited field-of-view image). Such outdoor LDR panoramic images can be have estimated LM lighting parameters (e.g., estimated using the trained panoramic lighting parameter neural network) that can be used as ground-truth LM lighting parameters. The ground-truth LM lighting parameters can be used to determine the accuracy of the estimated LM parameters as determined by the standard image lighting parameter neural network. In particular, after LM lighting parameters are determined for an input LDR standard image, the determined LM lighting parameters can be compared with the ground-truth LM lighting parameters. During training, the lighting estimation system can minimize loss based on the determined LM lighting parameters and the ground-truth LM lighting parameters such that the system learns to determine accurate lighting parameters.

In more detail, the accuracy of determined LM lighting parameters can be analyzed to determine error in the standard image lighting parameter estimate neural network. Error can be based on a variety of losses. Loss can be based on comparing an output from the panoramic lighting parameter neural network with a known ground-truth. In particular, the determined LM average sky color parameter from the standard image lighting parameter neural network can compared to a corresponding ground-truth LM average sky color parameter to calculate loss (e.g., sky loss). In addition, the determined LM mean sun color parameter generated by the standard image lighting parameter neural network can compared to a corresponding ground-truth LM mean sun color parameter to calculate loss (e.g., sun loss). The determined LM global scattering lighting parameter (i.e., $\beta$) generated by the standard image lighting parameter neural network can compared to a corresponding ground-truth LM scattering of the global scattering parameter to calculate loss (e.g., $\beta$ loss). The determined LM local scattering lighting parameter (i.e., $\kappa$) generated by the standard image lighting parameter neural network can compared to a corresponding ground-truth LM local scattering lighting parameter to calculate loss (e.g., $\kappa$ loss). The determined LM turbidity lighting parameter (i.e., t) generated by the standard image lighting parameter neural network can compared to a corresponding ground-truth LM turbidity lighting parameter to calculate loss (e.g., t loss). In addition, determined LM sun position can compared to a corresponding ground-truth LM sun position to calculate loss (e.g., sun position loss).

Further, the determined LM lighting parameters can be compared with the ground-truth LM lighting parameters by applying the lighting parameters to a scene to calculate loss. Such a scene can be the same basic three-dimensional scene previously discussed (e.g., a scene of geometric primitives, such as spheres, with varying surface material properties). The scenes can then be compared to determine the accuracy of the estimated LM lighting parameters. This accuracy can indicate errors in the standard image lighting parameter estimate neural network. It is advantageous to use rendered scenes to correct errors in the standard image lighting parameter estimate neural network because rendering a three-dimensional scene with HDR lighting (e.g., using the LM lighting parameters) is very computationally expensive. Loss can be calculated using rendered scenes based on determined LM parameters compared to ground-truth rendered scenes. Such rendered scenes can include a rendered scene based on determined LM sky parameters (e.g., using a LM sky model) and a rendered scene based on determined LM sun parameters (e.g., using a LM sun model). Errors determined from comparing the scene(s) with estimated LM lighting parameters with the scene(s) with ground-truth lighting parameters can be used to update the lighting parameter estimate neural network.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out HDR lighting estimation for a LDR image (e.g., of an outdoor panoramic scene and/or an outdoor standard scene). In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate HDR lighting estimation from a single LDR image. In some embodiments, the single LDR image can be a 360 degree panorama scene. In other embodiments, the single LDR image can be a limited field-of-view scene. A LDR image can be a still image or taken from a video. The LDR image can be selected or input in any manner. For example, a user may take a picture using a camera function on a device. As another example, a desired LDR image can be selected from a repository, for example, a repository stored in a data store accessible by a network or stored locally at the user device 102a. In other cases, an image may be automatically selected or detected. Based on the input LDR image, (e.g., provided via a user device or server), HDR lighting parameters can be estimated for the input LDR image. The HDR lighting parameters can be output to a user, for example, to the user via the user device 102a. For instance, in one embodiment, the HDR lighting parameters can be displayed via a display screen of the user device. In other embodiments, the HDR lighting parameters can be automatically applied to objects composited with the input LDR image. As an example, application 110 can be ADOBE DIMENSION (e.g., utilizing a Match Image Sunlight feature).

As described herein, server 108 can facilitate HDR lighting estimation from a LDR image via lighting estimation system 106. Server 108 includes one or more processors, and one or more computer-readable media. The computer-readable media includes computer-readable instructions executable by the one or more processors. The instructions may optionally implement one or more components of lighting estimation system 106, described in additional detail below.

Lighting estimation system 106 can train and operate a lighting estimation neural network system in order to estimate HDR lighting parameters from a single LDR image. Such a neural network system can be comprised of one or more neural networks trained to generate a designated output. Once trained, the neural network can estimate HDR lighting parameters for an input LDR scene. Such a LDR scene can a panoramic scene or a limited field-of-view scene.

For cloud-based implementations, the instructions on server 108 may implement one or more components of illumination estimation system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of illumination estimation system 106 may be implemented completely on a user device, such as user device 102a. In this case, lighting estimation system 106 may be embodied at least partially by the instructions corresponding to application 110.

Figure 1B:
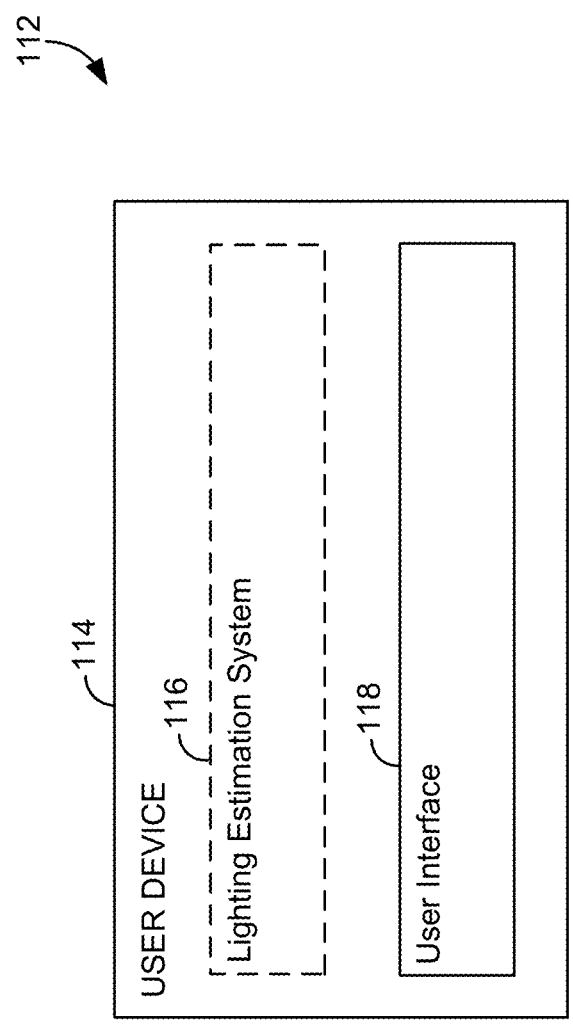
FIG. 1B depicts an example configuration of an operating environment in which some implementations of the present disclosure can be employed, in accordance with various embodiments.

Referring to FIG. 1B, aspects of an illustrative lighting estimation system are shown, in accordance with various embodiments of the present disclosure. FIG. 1B depicts a user device 114, in accordance with an example embodiment, configured to allow for estimating HDR lighting from an LDR image using a lighting estimation system. The user device 114 may be the same or similar to the user device 102a-102n and may be configured to support the lighting estimation system 116 (as a standalone or networked device). For example, the user device 114 may store and execute software/instructions to facilitate interactions between a user and the lighting estimation system 116 via the user interface 118 of the user device.

A user device can be utilized by a user to perform lighting estimation. In particular, a user can select and/or input a LDR image to identify HDR lighting for the image utilizing user interface 118. An image can be selected or input in any manner. The user interface may facilitate the user accessing one or more stored images on the user device (e.g., in a photo library), and/or import images from remote devices and/or applications. As can be appreciated, images can be input without specific user selection. Images can include frames from a video. Based on the input and/or selected image, illumination estimation system 116 can be used to perform HDR lighting estimation of the image using various techniques, some of which are further discussed below. User device 114 can also be utilized for displaying the determined lighting parameters.

Figure 2:
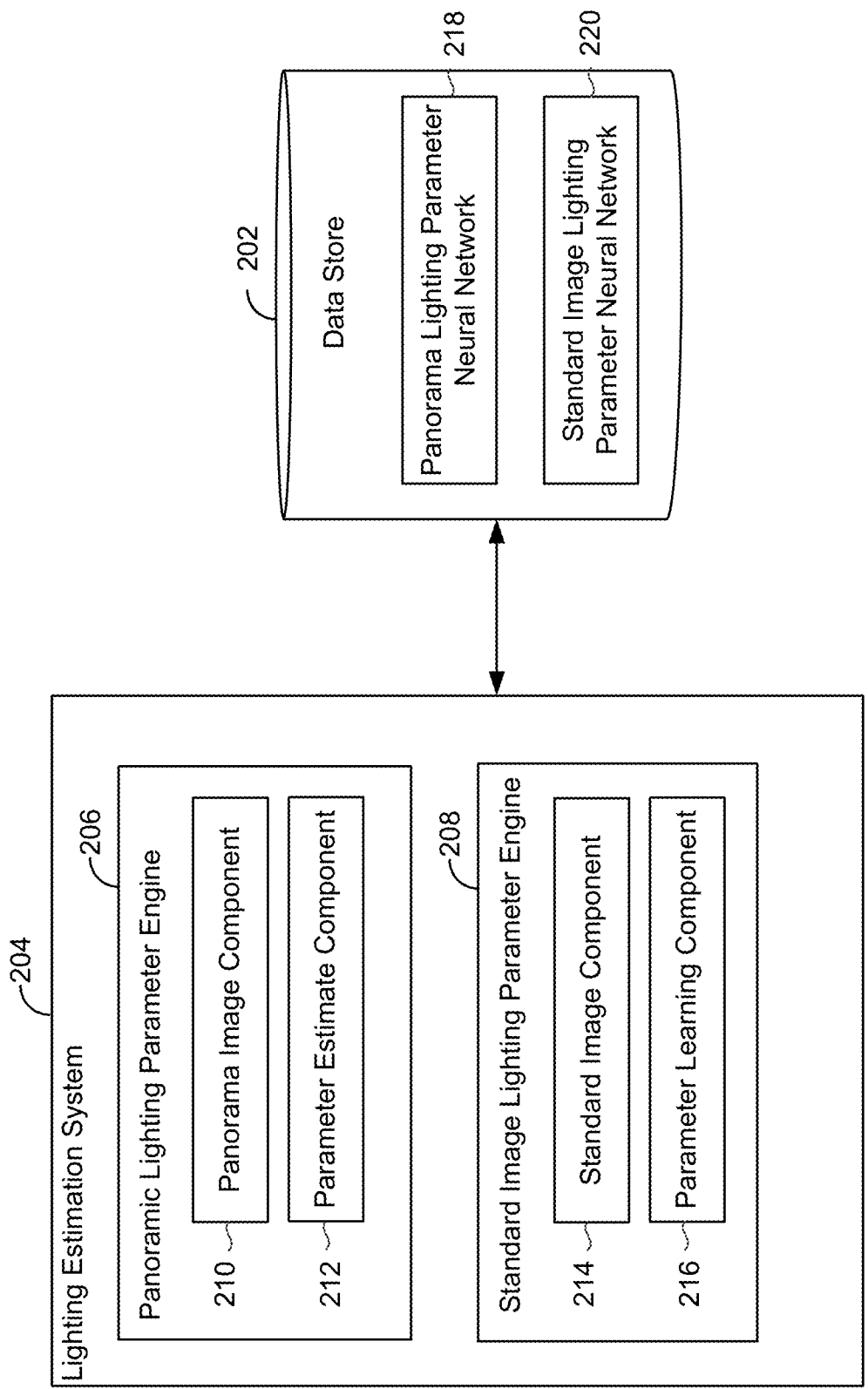
FIG. 2 depicts an example configuration of an operating environment in which some implementations of the present disclosure can be employed, in accordance with various embodiments of the present disclosure.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9. It should be understood that operating environment 200 shown in FIG. 2 is an example of one suitable operating environment. Among other components not shown, operating environment 200 includes a number of user devices, networks, and server(s).

Lighting estimation system 204 includes panoramic lighting parameter engine 206, and standard image lighting parameter engine 208. The foregoing engines of lighting estimation system 204 can be implemented, for example, in operating environment 100 of FIG. 1A and/or operating environment 112 of FIG. 1B. In particular, those engines may be integrated into any suitable combination of user devices 102*a* and 102*b* through 102*n* and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the lighting estimation system.

As shown, a lighting estimation system can operate in conjunction with data store 202. Data store 202 can store computer instructions (e.g., software program instructions, routines, or services), data, and/or models used in embodiments described herein. In some implementations, data store 202 can store information or data received via the various engines and/or components of lighting estimation system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images used for training the lighting estimation system. Such images can be input into data store 202 from a remote device, such as from a server or a user device.

The data stored in data store 202 can include training data. Training data generally refers to data used to train a neural network, or portion thereof. As such, the training data can include ground-truth HDR panorama images, training LDR images, ground-truth render images, estimated render images, or the like. In some cases, data store 202 receives data from user devices (e.g., an input image received by user device 202*a* or another device associated with a user, via, for example, application 210). In other cases, data is received from one or more data stores in the cloud.

Data store 202 can also be used to store a lighting estimation neural network system. Such a neural network system may be comprised of one or more neural networks, such as a neural network trained to estimate HDR lighting parameters for an input panoramic LDR image (e.g., panoramic lighting parameter neural network 218) and/or neural network trained to estimate HDR lighting parameters for an input standard LDR image (e.g., standard image lighting parameter neural network 220). One implementation can employ a convolutional neural network architecture for the one or more neural networks.

Panoramic lighting parameter engine 206 may be used to train and/or run the panoramic lighting parameter neural network to estimate HDR lighting parameters for a LDR panorama image. As depicted in FIG. 2, panoramic lighting parameter engine 206 includes panorama image component 210 and parameter estimate component 212. The foregoing components of panoramic lighting parameter engine 206 can be implemented, for example, in operating environment 100 of FIG. 1A and/or operating environment 112 of FIG. 1B. In particular, these components may be integrated into any suitable combination of user devices 102*a* and 102*b* through 102*n* and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the panoramic lighting parameter engine. Although these components are illustrated separately, it can be appreciated that the functionality described in association therewith can be performed by any number of components.

Panorama image component 210 can generally be used to generate and/or modify any image utilized in relation to the panoramic lighting parameter neural network. Images generated by the panorama image component can include HDR panorama images, training LDR panorama images, estimated HDR panorama images, ground-truth render scenes, and estimated render scenes.

In implementations, the panorama image component 210 can generate LDR panorama images from HDR panorama images. Such a HDR panorama image has known LM illumination/lighting properties. These known properties can be used to provide information used as ground-truth during training of the panoramic lighting parameter neural network. The panorama image component 210 convert the HDR panorama images into LDR panorama images for use in training the panoramic lighting parameter neural network. To convert an HDR panorama image into a LDR panorama image, a random exposure factor can be applied, clipping the maximum value at one and quantizing the image to eight bits.

Parameter estimate component 212 can be used to run a panoramic lighting parameter neural network 218. The panoramic lighting parameter neural network can generally use a convolutional neural network architecture. In particular, the convolutional neural network can receive an input LDR panorama image. From the input LDR panorama image, the convolutional neural network can use an encoder (e.g., an auto-encoder) with skip-links to regress a HDR panorama from the input LDR panorama image. In this regression, an equirectangular format can be used with the assumption such that the panorama is rotated such that the sun is in the center.

The convolutional neural network can have a path from a latent vector (e.g., z) to two fully connected layers that can estimate the sun elevation for the input LDR panorama image. Advantageously, estimating the sun elevation can add robustness to the convolutional neural network in estimating LM lighting parameters. Another path from the latent vector (e.g., z) can connect to an unsupervised domain adaptation branch. Advantageously, having a domain adaptation branch in the convolutional neural network can help the network generalize to real data. A further path from the latent vector (e.g., z) can be added that predicts the LM parameters (e.g., based on the LM sun model and the LM sky model). In this way, the network can learn to estimate the sun and sky colors, the sun shape, and the sky turbidity (e.g., from the latent vector). This path can have a structure of two consecutive FC layers with a size of 512 and 25 neurons where the output layer has 9 neurons corresponding to the nine LM sky parameters.

In one embodiment, parameter estimate component 212 can be used to train the panoramic lighting parameter neural network. In particular, parameter estimate component 212 may select a training LDR panorama image for use in training the panoramic lighting parameter neural network. Such a training LDR panorama image can be a LDR panoramic image generated by the panorama image component 212. From a training LDR panorama image, the panoramic lighting parameter neural network can estimate LM lighting parameters.

Parameter estimate component 212 can construct an estimated HDR panorama image from the LDR panorama image. In particular, a latent vector generated by the panoramic lighting parameter neural network (e.g., z) can be used to generate an estimated HDR panorama image using a decoder network. In particular, the estimated LM lighting parameters generated by the panoramic lighting parameter neural network can be used to generate an estimated HDR panorama image using the estimated LM lighting parameters. During training of the panoramic lighting parameter neural network, the estimated HDR panorama image may be compared to the corresponding ground-truth HDR panorama image to determine errors. During training, the estimated HDR panorama image can also be multiplied with a pre-computed transport matrix of a synthetic scene and then compared with the corresponding ground-truth HDR panorama image multiplied with the pre-computed transport matrix of the synthetic scene to determine errors. In addition, the estimated sun elevation can be compared with a ground-truth sun elevation to determine errors. Based on such comparisons, parameter estimate component 212 may adjust or modify the panoramic lighting parameter neural network so that the network becomes more accurate and performs accurately on real panoramic LDR images. The process of training the panoramic lighting parameter neural network is discussed further with respect to FIGS. 3 and 4.

Parameter estimate component 212 can also generate rendered scenes using the LM lighting parameters. In particular, the estimated LM lighting parameters generated by the panoramic lighting parameter neural network can be used to generate an estimated render scene. For instance, the estimated LM lighting parameters can be used to generate separate HDR environment maps based on the LM sun model and LM sky model. These generated environment maps can then be used to render a scene that can be used to determine error in the panoramic lighting parameter neural network. The scene can be generated using a pre-computed transport matrix. For instance, the transport matrix can be used to render a scene with 64×64 resolution. This estimated render scene may be compared to the corresponding ground-truth render scene to determine errors. Based on such comparisons, parameter estimate component 212 may adjust or modify the panoramic lighting parameter neural network so that the network becomes more accurate and performs accurately on real panoramic LDR images.

Upon completion of training, the panoramic lighting parameter neural network of the lighting estimation neural network system can estimate HDR lighting for LDR panorama images input into the system. The HDR lighting can be based on LM lighting parameters. HDR lighting estimation may be performed using parameter estimate component 212. The method of estimating HDR lighting from input LDR panorama images may be similar to the process described for training the neural network system, however, in execution, the network is not evaluated and/or updated for error. Accordingly, the HDR lighting parameters for the input LDR panorama images may be unknown, but the trained neural network system may, nevertheless, estimate HDR lighting for the images.

In embodiments, parameter estimate component 212 may run a trained panoramic lighting parameter neural network of the lighting estimation neural network system to estimate HDR lighting parameters for an input LDR panorama image. The input LDR panorama image may be received from a user at a user device. The user may select or input an image in any available manner. For example, a user may take a picture using a camera on a device, for example, user device 102a-102n and/or user device 114 of FIGS. 1A-1B. As another example, a user may select a desired image from a repository stored in a data store accessible by a network or stored locally at the user device 102a-102n and/or user device 114 of FIG. 1A-1B. In other embodiments, a user can input the image by inputting a link or URL to an image. Based on the input LDR panorama image, HDR lighting parameters can be estimated by parameter estimate component 212.

The HDR lighting parameters may be provided directly to a user via a user device, for example, user device 102a-102n and/or user device 114. In other aspects, the HDR lighting parameters can be used to automatically adjust lighting of a selected image or object within an image to reflect the HDR lighting parameters estimated from the input LDR panorama image.

In one embodiment, parameter estimate component 212 can be used to estimate LM lighting parameters for a dataset of LDR images that can be used to train a standard image lighting parameter neural network. For instance, the dataset (e.g., SUN360 database) can be run through the trained panoramic lighting parameter neural network. For the LDR images in the dataset, the trained panoramic lighting parameter neural network can estimate sun and sky LM parameters (e.g., $\hat{q}_{sun}$ and $\hat{q}_{sky}$), sun position (e.g., $l_{sun}$). The sun LM parameter can be based on sun and sun shape (e.g., $\{w_{sun}, \beta, \kappa\}$). The sky LM parameter can be based on sky color and turbidity (e.g., $\{w_{sky}, t\}$). Sun position can be estimated by finding the center of mass of the largest saturated region in the sky.

Standard image lighting parameter engine 208 may be used to train the standard image lighting parameter neural network to estimate HDR lighting parameters for a LDR standard image. As depicted in FIG. 2, standard image lighting parameter engine 208 includes standard image component 214 and parameter learning component 216. The foregoing components of standard image lighting parameter engine 208 can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. While the various components are depicted as separate components, it should be appreciated that a single component can perform the functionality of all components.

Additionally, in implementations, the functionality of the components can be performed using additional components and/or engines. Further, it should be appreciated that the functionality of the components can be provided by an engine separate from the standard image lighting parameter engine. Although these components are illustrated separately, it can be appreciated that the functionality described in association therewith can be performed by any number of components.

Standard image component 214 can generally be used to generate and/or modify any image utilized in relation to the standard image lighting parameter neural network. Images generated by the standard image component can include HDR panorama images, LDR panorama images, LDR standard images, ground-truth render scenes, and estimated render scenes.

In implementations, the standard image component 214 can generate LDR standard images from LDR panorama images. For instance, standard image component 214 can take a LDR panorama image (e.g., from SUN360 database) and crop the LDR panorama image to generate LDR standard images (e.g., seven limited field-of-view images). Such a HDR panorama image has known HDR illumination/lighting properties. These known properties can be used to provide information used as ground-truth during training of the panoramic lighting parameter neural network. The panorama image component 210 convert the HDR panorama images into LDR panorama images for use in training the panoramic lighting parameter neural network. To convert an HDR panorama image into a LDR panorama image, a random exposure factor can be applied, clipping the maximum value at one and quantizing the image to eight bits.

Parameter learning component 216 can be used to run a standard image lighting parameter neural network 220. The standard image lighting parameter neural network can generally use a convolutional neural network architecture. In particular, a standard LDR image can be input into the convolutional neural network. The convolutional neural network can estimate the LM lighting parameters from the standard LDR image (e.g., $l_{sun}$, $\hat{q}_{sun}$, and $\hat{q}_{sky}$). The architecture of the convolutional neural network can be comprised of five convolutional layers, followed by two consecutive FC layers. Each convolutional layer of the convolutional neural network can be followed by a sub-sampling step, batch normalization, and an ELU activation function on all the convolutional layers. A sun position branch of the convolutional neural network can output a probability distribution over a discretized sun position. For sun position, 64 bins can be used for azimuth and 16 bins for elevation.

Parameter learning component 216 can be used to train the standard image lighting parameter neural network. In particular, parameter learning component 216 can select a training LDR standard image for training the standard image lighting parameter neural network. Such a training LDR standard image can be a standard image generated by the standard image component 214. From a training LDR standard image, the standard image lighting parameter neural network may output LM lighting parameters. The LM lighting parameters can be based on sun and sky LM lighting parameter models.

Parameter learning component 216 can then generate a rendered scene using the LM lighting parameters. In particular, the estimated LM lighting parameters generated by the standard image lighting parameter neural network can be used to generate an estimated render scene. In some implementations, this estimated render scene may be compared to the corresponding ground-truth render scene to determine errors. In some other implementations, this estimated render scene may be evaluated for realism to determine errors. Based on such comparisons, parameter learning component 216 may adjust or modify the standard image lighting parameter neural network so that the network becomes more accurate and performs accurately on real LDR standard images. The process of training the standard image lighting parameter neural network is discussed further with respect to FIGS. 3 and 5.

The standard image lighting parameter neural network of the lighting estimation neural network system may be used to estimate HDR lighting for LDR standard images input into the system. The HDR lighting can be based on LM lighting parameters. HDR lighting estimation may be performed using parameter learning component 216. The method of estimating LM lighting parameters from input LDR standard image images may be similar to the process described for training the standard image lighting parameter neural network, however, in execution, the network is not evaluated and/or updated for error. Accordingly, the LM lighting parameters for the input LDR standard image images may be unknown, but the trained standard image lighting parameter neural network may, nevertheless, estimate LM lighting for the images.

In embodiments, parameter learning component 216 may run a trained standard image lighting parameter neural network of the lighting estimation neural network system to estimate LM lighting parameters for an input LDR standard image. The input LDR standard image may be received from a user at a user device. The user may select or input an image in any available manner. For example, a user may take a picture using a camera on a device, for example, user device 102a-102n and/or user device 114 of FIGS. 1A-1B. As another example, a user may select a desired image from a repository stored in a data store accessible by a network or stored locally at the user device 102a-102n and/or user device 114 of FIG. 1A-1B. In other embodiments, a user can input the image by inputting a link or URL to an image. Based on the input LDR standard image, LM lighting parameters can be estimated by parameter learning component 216.

The determined LM lighting parameters may be provided directly to a user via a user device, for example, user device 102a-102n and/or user device 114. In other aspects, the LM lighting parameters can be used to automatically adjust lighting of a selected image or object within an image to reflect the HDR lighting parameters estimated from the input LDR standard image.

Figure 3:
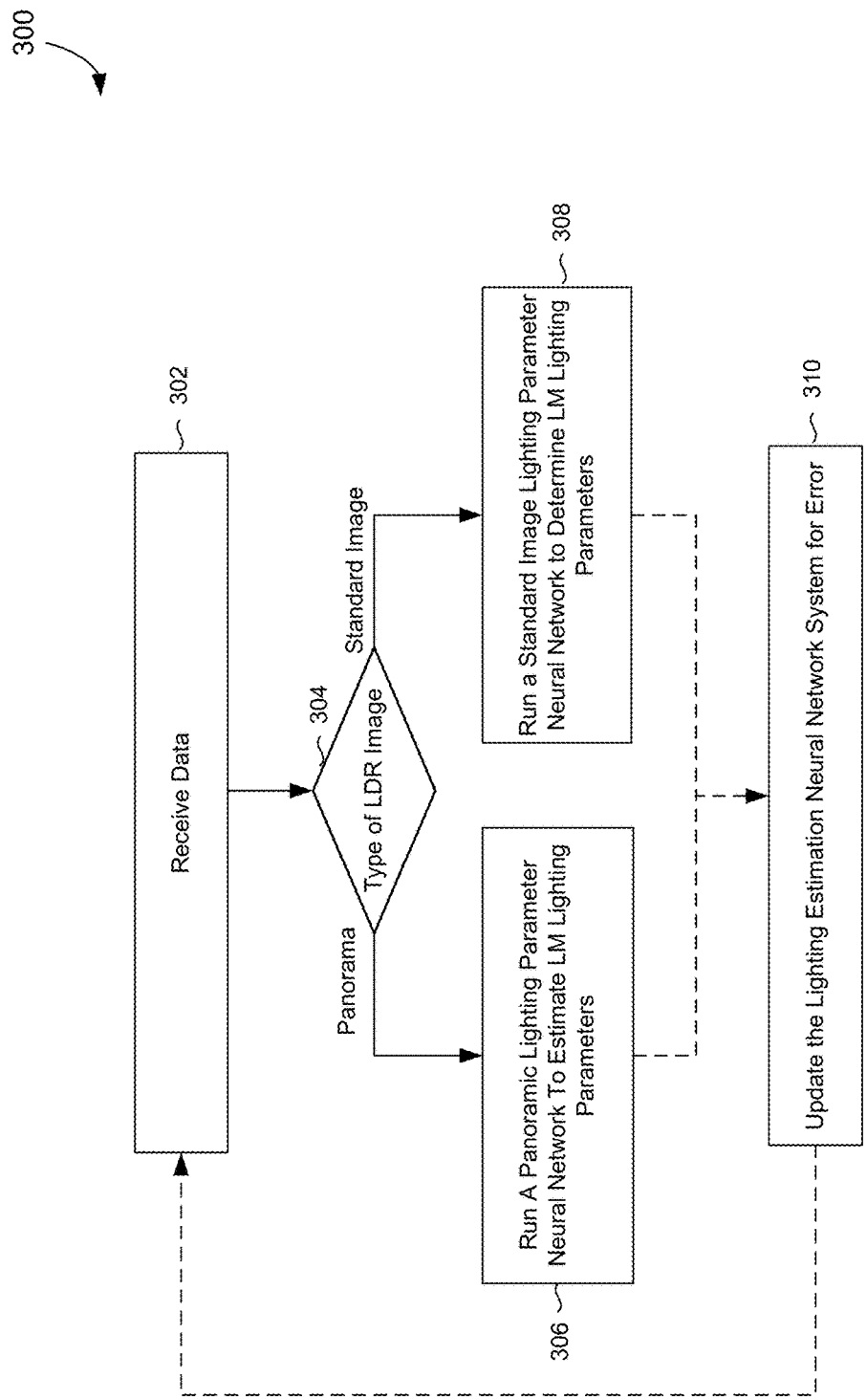
FIG. 3 depicts a process flow is provided showing an embodiment of training and/or running a lighting estimation system, in accordance with embodiments of the present disclosure.

With reference to FIG. 3, a process flow is provided showing an embodiment of method 300 for training and/or running a lighting estimation system, in accordance with embodiments of the present disclosure. Such a lighting estimation system can be implemented using, for example, a lighting estimation neural network system. The lighting estimation neural network system can be comprised of a panoramic lighting parameter neural network and a standard image lighting parameter neural network. Aspects of method 300 can be performed, for example, by panoramic lighting parameter engine 206 and/or standard image lighting parameter engine 208, as discussed with reference to FIG. 2.

At block 302, data can be received. In some embodiments, the data can be received from an online depository. In other embodiments, the data can be received from a local system. Such received data can be selected or input into the lighting estimation neural network system in any manner (e.g., by a user). For example, a user can access one or more stored images on a device (e.g., in a photo library) and select an image from remote devices and/or applications for import into the lighting estimation neural network system.

In some instances, received data can be data used to train the lighting estimation neural network system. Such data can include datasets for training the panoramic lighting parameter neural network. One dataset used for training the panoramic lighting parameter neural network can include over 44,000 synthetic HDR panoramas created by lighting a virtual three-dimensional city model (e.g., from Unity Store) with over 9,500 HDR sky panoramas (e.g., from the Lavel HDR sky database). Another dataset used for training the panoramic lighting parameter neural network can contain around 150 daytime outdoor panoramas from a database of HDR outdoor panoramas.

LDR datasets can also be used for training the panoramic lighting parameter neural network. For instance, a LDR dataset of over 19,500 LDR panorama images (e.g., from SUN360 dataset) can be used for training the panoramic lighting parameter neural network. Further, another LDR dataset of almost 5,000 images from a real-world map (e.g., Google Street View) can be used for training the panoramic lighting parameter neural network. Such LDR datasets can be used in training the used for training the panoramic lighting parameter neural network for domain loss adaptation. The data can also include datasets for training the standard image lighting parameter neural network. For instance, the LDR dataset of over 19,500 LDR panorama images (e.g., from SUN360 dataset) can be used for training the standard image lighting parameter neural network. In particular, the LDR panorama images can be cropped into LDR standard images (e.g., seven standard images for each panorama image). Data associated with such a LDR dataset can also be received (e.g., ground-truth LM lighting parameters). Associated data can include ground-truth LM lighting parameters for the LDR dataset. These ground-truth LM lighting parameters can be estimated using, for example, the trained panoramic lighting parameter neural network.

At block 304, a type of LDR image can be determined. The LDR image can be a panorama image or a standard image. When the LDR image is a panorama image, the method proceeds to block 306. When the LDR image is a standard image, the method proceeds to block 308. In embodiments related to training, the lighting estimation neural network system can first be trained using LDR panorama images (e.g., to train the panoramic lighting parameter neural network) and then the lighting estimation neural network system can be trained using LDR standard images (e.g., to train the standard image lighting parameter neural network).

At block 306, a panoramic lighting parameter neural network of the lighting estimation neural network system can be run using data. The data can be, for example, the data received at block 302. In an embodiment where the lighting estimation neural network system is undergoing training, the data can be data for training the system (e.g., images and ground-truth lighting information). In an embodiment where a trained lighting estimation neural network system is being implemented, the data can be LDR images (e.g., panorama images). For instance, the data can be an LDR panorama image input into the panoramic lighting parameter neural network to estimate LM lighting parameters. Such estimated lighting parameters can be LM lighting parameters including: sky color, turbidity, sun color, shape of the sun, and the sun position. For example, such estimated lighting parameters can be extrapolated from a latent representation of the panoramic lighting parameter neural network. Such a latent representation can be a latent vector (e.g., z).

In embodiments where the panoramic lighting parameter neural network is undergoing training, an image from training data can be input such that the panoramic lighting parameter neural network estimates the LM lighting parameters at block 306. In such embodiments, the method can then proceed to block 310. At block 310, the panoramic lighting parameter neural network of the lighting estimation neural network system can be updated using determined error. Errors based on the output (e.g., determined lighting parameters) can be fed back through the panoramic lighting parameter neural network to appropriately train the network.

Error can be based on a variety of losses. Loss can be based on comparing an output from the panoramic lighting parameter neural network with a known ground-truth. In particular, the estimated LM lighting parameters generated by the panoramic lighting parameter neural network can be used to generate an estimated HDR panorama image (e.g., having the estimated LM lighting parameters). This estimated HDR panorama image may be compared to a corresponding ground-truth HDR panorama image to calculate loss (e.g., panorama loss). In addition, the estimated sun elevation can be compared with a ground-truth sun elevation to calculate loss (e.g., sun elevation loss). The estimated HDR panorama image can also be multiplied with a pre-computed transport matrix of a synthetic scene and then compared with the corresponding ground-truth HDR panorama image multiplied with the pre-computed transport matrix of the synthetic scene to calculate loss (e.g., render loss).

Further, the estimated LM lighting parameters can be compared with the ground-truth lighting parameters by applying the lighting parameters to a scene to calculate loss. Scenes can then be compared to determine the accuracy of the estimated LM lighting parameters. Such rendered scenes can include a rendered scene based on LM sky parameters, a rendered scene based on estimated LM sun parameters, and a rendered scene based on the combination of estimated LM sky parameters and estimated LM sun parameters. Errors determined from comparing the scene(s) with estimated LM lighting parameters with the scene(s) with ground-truth lighting parameters can be used to update the lighting parameter estimate neural network.

In some embodiments, upon completion of training of the lighting estimation neural network system, the system can be utilized to output estimated LM lighting parameters for an image, at block 306 (for panoramic images). For instance, upon receiving an image, the trained lighting estimation neural network system can be run to determine lighting parameters for a LDR panorama image.

At block 308, a standard image lighting parameter neural network of a lighting estimation neural network system can be run using data. The data can be, for example, the data received at block 302. In an embodiment where the lighting estimation neural network system is undergoing training, the data can be data for training the system (e.g., images and ground-truth LM lighting information). In an embodiment where a trained lighting estimation neural network system is being implemented, the data can be LDR images (e.g., standard images). For instance, the data can be an LDR image input into the standard image lighting parameter neural network to determine LM lighting parameters. To run the lighting estimation neural network system during training, an image from training data can be input such that the standard image lighting parameter neural network learns to estimate lighting parameters at block 308. Such lighting parameters can be LM lighting parameters including: sky color, turbidity, sun color, shape of the sun, and the sun position. For example, such estimated lighting parameters can be extrapolated from a latent representation of the standard image lighting parameter neural network. Such a latent representation can be a latent vector (e.g., z).

In embodiments where the standard image lighting parameter neural network is undergoing training, the method can proceed to block 310. At block 310, the standard image lighting parameter neural network of the lighting estimation neural network system can be updated using determined error. Errors in the output (e.g., determined lighting parameters) can be fed back through the standard image lighting parameter neural network of the lighting estimation neural network system to appropriately train the network.

Error can be based on a variety of losses. Loss can be based on comparing an output from the panoramic lighting parameter neural network with a known ground-truth. In particular, the determined LM sky color lighting parameter generated by the standard image lighting parameter neural network can compared to a corresponding ground-truth LM sky color lighting parameter to calculate loss (e.g., sky loss). In addition, the determined LM global scattering parameter generated by the standard image lighting parameter neural network can compared to a corresponding ground-truth LM global scattering parameter to calculate loss (e.g., sun loss). The determined LM scattering of the global scattering parameter (i.e., $\beta$) generated by the standard image lighting parameter neural network can compared to a corresponding ground-truth LM scattering of the global scattering parameter to calculate loss (e.g., $\beta$ loss). The determined LM local scattering lighting parameter (i.e., $\kappa$) generated by the standard image lighting parameter neural network can compared to a corresponding ground-truth LM local scattering lighting parameter to calculate loss (e.g., $\kappa$ loss). The determined LM turbidity lighting parameter (i.e., t) generated by the standard image lighting parameter neural network can compared to a corresponding ground-truth LM turbidity lighting parameter to calculate loss (e.g., t loss).

Further, the determined LM lighting parameters can be compared with the ground-truth LM lighting parameters by applying the lighting parameters to a scene to calculate loss. Scenes can then be compared to determine the accuracy of the estimated LM lighting parameters. Such rendered scenes can include a rendered scene based on determined LM sky parameters and a rendered scene based on determined LM sun parameters. Errors determined from comparing the scene(s) with estimated LM lighting parameters with the scene(s) with ground-truth lighting parameters can be used to update the lighting parameter estimate neural network.

In some embodiments, upon completion of training of the lighting estimation neural network system, the system can be utilized to output a determined lighting parameters for an image, at block 308 (for standard images). For instance, upon receiving an image, the trained lighting estimation neural network system can be run to determine lighting parameters for a LDR standard image.

Figure 4:
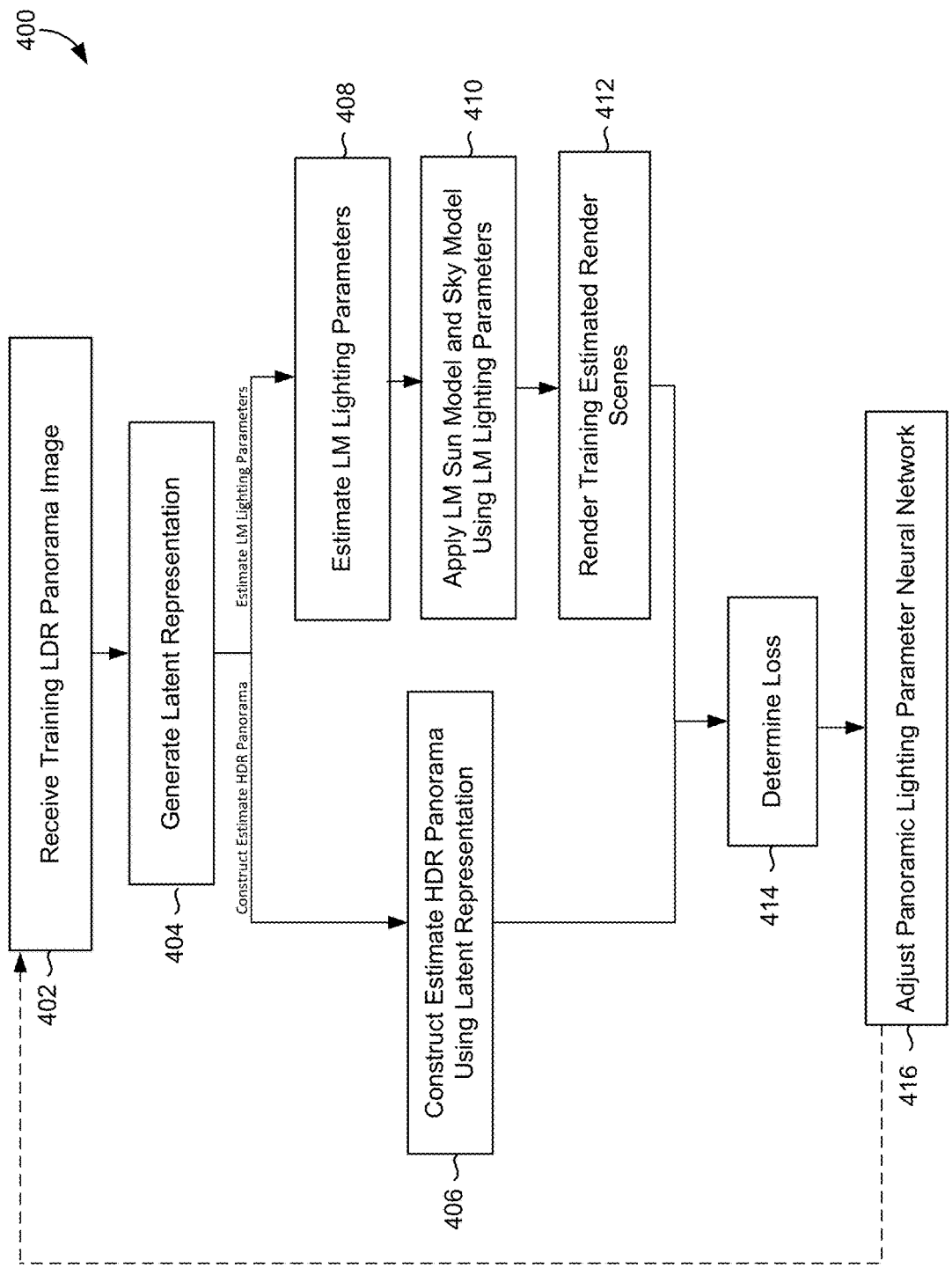
FIG. 4 depicts a process flow showing an embodiment for training a panorama lighting parameter neural network of a lighting estimation neural network system.

Turning now to FIG. 4, FIG. 4 provides a process flow showing an embodiment of method 400 for training a panorama lighting parameter neural network of a lighting estimation neural network system. In particular, the panorama lighting parameter neural network can be trained to estimate HDR lighting parameters from a LDR panorama image, in accordance with embodiments of the present disclosure. Method 400 can be performed, for example by lighting estimation system 204, as illustrated in FIG. 2.

At block 402, a LDR panorama image can be received. In particular, a panorama lighting parameter neural network can received the LDR panorama image. Such an image can be received from, for example, training data stored on data store 202 of FIG. 2 and/or from a database stored in the cloud. In embodiments, a LDR panorama image can have pixel values no higher than 255:1. Images can be in standard formats such as GIFF, TIFF, and JPEG. The LDR panorama image can be an image with an enlarged field of view (i.e., a panorama). For example, the LDR panorama image can be a 360-degree panoramic image. Such 360-degree images of outdoor scenes provide direct views of the sun and sky, including any cloud cover, which are typically the sources of light in an outdoor scene.

At block 404 the panorama lighting parameter neural network can generate a latent representation. For instance, the latent representation can be a latent vector (e.g., z). In some instances, such a latent representation (e.g., as generated at block 404) can be used to construct an estimated HDR panorama at block 406. In particular, a latent representation (e.g., z) from the panorama lighting parameter neural network can be used to generate an estimated HDR panorama image.

In other instances, at block 408, LM lighting parameters can be estimated for the LDR training image (e.g., from the latent representation generated at block 404). This can be accomplished using a panorama lighting parameter neural network of a lighting estimation neural network system. For instance, the panorama lighting parameter neural network can estimate LM lighting parameters. For instance, the LM lighting parameters can be extrapolated (e.g., estimated) based on a latent representation generated by a panorama lighting parameter neural network (e.g., generated at block 404). The LM lighting parameters can include sky color, sky turbidity, sun color, sun shape, and sun position. A non-limiting example of a model (e.g., LM lighting parameter model) that can be used by the panorama lighting parameter neural network to determine the LM lighting parameters is:

$$f_{LM}(l;q_{LM})=f_{sun}(l;q_{sun},l_{sun})+f_{sky}(l;q_{sky},l_{sun})$$

In such an equation $l_{sun}=[\theta_{sun},\varphi_{sun}]$ can be the sun position in spherical coordinates. The q. are component-specific parameters. In particular, the LM model can have eleven parameters that are estimated, as follows:

$$q_{LM}=\{w_{sky},t,w_{sun}\beta,\kappa,l_{sun}\}$$

At block 410, a LM sky model and LM sun model can be applied using the estimated LM lighting parameters. In particular, the LM sky model: $f_{sky}(I)$ can include the Preetham sky model $f_P(\bullet)$, multiplied channel-wise with an average sky color $w_{sky} \in \mathbb{R}^3$. A non-limiting example can be:

$$f_{sky}=(l;q_{LM},l_{sun})=w_{sky}f_P(\theta_{sun},\gamma_{sun},t)$$

Further, $\gamma_{sun}$ can be the angle between sky element l and the sun position $l_{sun}$ and t can be the sky turbidity. The LM sun model: $f_{sun}$ can be defined using a limiting example:

$$f_{sun}(l;q_{sun},l_{sun})=w_{sun}\exp\left(-\beta\exp\left(\frac{-\kappa}{\gamma_{sun}}\right)\right)$$

In such an equation, ($\beta$, $\kappa$) can be two parameters that control the shape of the sun. In addition, $w_{sun} \in \mathbb{R}^3$ can be the mean sun color.

At block 412, training estimated render scenes can be rendered. For instance, the training estimated render scenes can be based on a basic three-dimensional scene to which lighting parameters can easily be applied (e.g., a scene of three spheres of with varying surface material properties). The training estimated render scene can be generated using pre-rendered scenes corresponding to the LM lighting parameters estimated by the panorama lighting parameter neural network. A pre-rendered transform matrix can be used to obtain rendered scene(s) corresponding to the estimated LM lighting parameters. For instance, the pre-rendered transform matrix can be used to generate the three-dimensional scene (e.g., synthetic scene of a diffuse sphere on a plane).

Upon obtaining the LM lighting parameters, rendered scenes can be generated. Such rendered scenes can include a rendered scene based on LM sky parameters, a rendered scene based on estimated LM sun parameters, and a rendered scene based on the combination of estimated LM sky parameters and estimated LM sun parameters. First, the rendered scene based on LM sky parameters can be generated by multiplying the transport matrix with a sky environmental map based on estimated LM sky parameters (e.g., $Tf_{sky}(\hat{q}_{sky})$). Second, the rendered scene based on LM sun parameters can be generated by multiplying the transport matrix a sun environmental map based on estimated LM sun parameters (e.g., $Tf_{sun}(\hat{q}_{sun})$). Third, the rendered scene based on combination of estimated LM sky parameters and estimated LM sun parameters can be generated by multiplying the transport matrix combined sky and sun environmental maps (e.g., LM lighting environmental map) based on estimated LM sun and sky parameters (e.g., $Tf_{LM}(\hat{q}_{LM})$).

The method can proceed to block 414 where loss is determined. Types of loss can be determined based on the constructed estimate HDR panorama, the sun elevation, an estimate rendered scene based on the constructed estimate HDR panorama, domain adaptation, estimate rendered scene based on the sun model, estimate rendered scene based on the sky model, and estimate rendered scene based on the combined sun and sky models. Such losses can be represented, respectively, using the following equations:

$$\mathcal{L}_{pano} = \|P^* - \hat{P}\|_1$$
$$\mathcal{L}_{\theta} = \|\theta^*_{sun} - \hat{\theta}_{sun}\|_2$$
$$\mathcal{L}_{render} = \|TP^* - T\hat{P}\|_2$$
$$\mathcal{L}_{da} = -\sum_{i=1} a_i^* \log \hat{a}_i$$

In such equations, the symbol (*) and (^) can denote ground-truth and the network output, respectively. In particular, the estimated LM lighting parameters generated by the panoramic lighting parameter neural network can be used to generate an estimated HDR panorama image (having the estimated LM lighting parameters) (e.g., $\hat{P}$). This estimated HDR panorama image may be compared to a corresponding ground-truth HDR panorama image (e.g., $P^*$) to calculate loss (e.g., panorama loss). Panorama loss can be based on pixel loss between the estimated HDR panorama image and the corresponding ground-truth HDR panorama image. Further, panorama loss can be computed in the log space. In addition, the estimated sun elevation (e.g., $\hat{\theta}_{sun}$) can be compared with a ground-truth sun elevation (e.g., $\theta^*_{sun}$) to calculate loss (e.g., sun elevation loss). The sun elevation loss can compare where the sun in in elevation in the panoramas (e.g., the angle with respect to the horizon line). Such an estimated HDR panorama image can also be multiplied with the transport matrix of the synthetic scene (e.g., TP*) and then compared with the corresponding ground-truth HDR panorama image multiplied with the pre-computed transport matrix of the synthetic scene (e.g., $T\hat{P}$) to calculate loss (e.g., render loss).

Further, additional render loss can be determined. In particular, the estimated LM lighting parameters can be compared with the ground-truth lighting parameters by applying the lighting parameters to a scene to calculate loss. Loss can be based on LM sky parameters, LM sun parameters, and a combination of LM sky parameters and LM sun parameters. Such losses can be represented, respectively, using the following equations:

$$\mathcal{L}_{sky} \|TP^*_{LDR} - Tf_{sky}(\hat{q}_{sky})\|_2$$
$$\mathcal{L}_{sun} = \|T(P^*_{HDR} - P^*_{LDR}) - Tf_{sun}(\hat{q}_{sun})\|_2$$
$$\mathcal{L}_{LM} = \|TP^*_{HDR} - Tf_{LM}(\hat{q}_{LM})\|_2$$

First, loss based on LM sky parameters can be determined. In particular, a ground-truth rendered scene based on LM sky parameters can be generated by multiplying the transport matrix with a LDR panorama (e.g., $TP^*_{LDR}$). The LDR panorama can be obtained by clipping a HDR panorama at one and quantizing the result to eight bits. In some embodiments, the LDR panorama can be the LDR panorama received at 402. The estimate rendered scene based on LM sky parameters can be generated by multiplying the transport matrix with a sky environmental map based on estimated LM sky parameters (e.g., $Tf_{sky}(\hat{q}_{sky})$). Such loss can be computed using L2 loss.

Second, loss based on LM sun parameters can be determined. In particular, a ground-truth rendered scene based on LM sun parameters can be generated by multiplying the transport matrix with a HDR panorama minus a LDR panorama (e.g., $T(P^*_{HDR} - P^*_{LDR})$). The LDR panorama can be obtained by clipping the HDR panorama at one and quantizing the result to eight bits. In some embodiments, the LDR panorama can be the LDR panorama received at 402. The estimate rendered scene based on LM sun parameters can be generated by multiplying the transport matrix with a sun environmental map based on estimated LM sun parameters (e.g., $Tf_{sun}(q_{sun})$). Such loss can be computed using L2 loss.

Third, loss based on LM parameters (e.g., combined LM sun and sky parameters) can be determined. In particular, a ground-truth rendered scene based on LM sun parameters can be generated by multiplying the transport matrix with a LDR panorama (e.g., the LDR panorama received at 402) (e.g., $TP^*_{LDR}$). The estimate rendered scene based on LM sun parameters can be generated by multiplying the transport matrix with combined sky and sun environmental maps (e.g., LM lighting environmental map) based on estimated LM sun and sky parameters (e.g., $Tf_{LM}(\hat{q}_{LM})$). Such loss can be computed using L2 loss.

When the training LDR image is a real LDR image, a weighted domain adaptation loss can be determined. Domain loss can be determined using loss similar to generative adversarial loss. For instance, domain loss can be implemented using cross-entropy loss. When the discriminator is able to identify differences between real and synthetic images, the neural network system typically does not perform accurately for real images. In this way, when the discriminator can identify a synthetic LDR image from a real LDR image, the panoramic lighting parameter neural network can be corrected for errors to make the network more accurate for real LDR images.

During training of the panorama lighting parameter neural network, domain loss can be weighted throughout training such that the loss is emphasized (or deemphasized) at different times. For instance, during the first few training cycles of the neural network system, the domain loss can be weighted as 0 (e.g., domain loss is not accounted for). During training, the weighting of domain loss can gradually increase through the training process up to 1. In embodiments, the weight of domain loss can be set to 1 at roughly half way through the training of the panoramic lighting parameter neural network.

At block 416, loss determined at 414 can be used to adjust the panorama lighting parameter neural network. It should be appreciated additional types of loss can also be used to correct for errors in the network. Errors determined using loss functions are used to minimize loss in the panorama lighting parameter neural network by backwards propagation of such errors through the system. As indicated in FIG. 4, blocks 402 through 416 may be repeated any number of times to train the panorama lighting parameter neural network.

Figure 5:
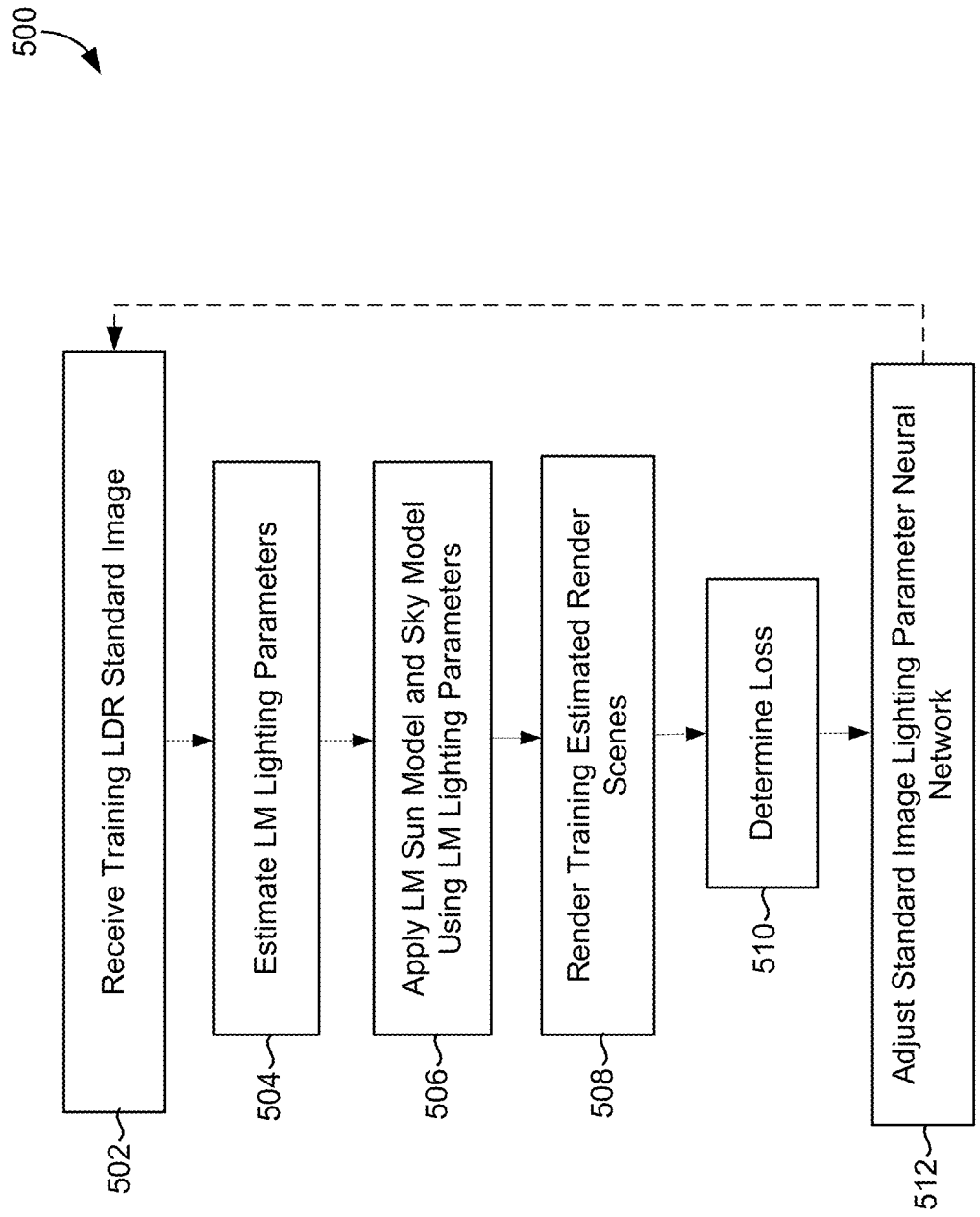
FIG. 5 depicts a process flow showing an embodiment for training a standard image lighting parameter neural network of a lighting estimation neural network system, from a LDR image, in accordance with embodiments of the present disclosure.

FIG. 5 provides a process flow showing an embodiment of method 500 for training a standard image lighting parameter neural network of a lighting estimation neural network system, in accordance with embodiments of the present disclosure. In particular, the standard image lighting parameter neural network can be trained to estimate HDR lighting parameters from a LDR panorama image, in accordance with embodiments of the present disclosure. Method 500 can be performed, for example by lighting estimation system 204, as illustrated in FIG. 2.

At block 502, a LDR panorama image can be received. Such an image can be received from, for example, training data stored on data store 202 of FIG. 2 and/or from a database stored in the cloud. In embodiments, a LDR panorama image can have pixel values no higher than 255:1. Images can be in standard formats such as GIFF, TIFF, and JPEG. The LDR standard image can be an image with a limited field-of-view (i.e., a field-of-view image equivalent to one seventh of a 360 degree panorama). For example, a LDR standard image can have around a 50-degree field-of-view.

At block 504 LM lighting parameters can be estimated for the LDR standard image. This can be accomplished using a standard image lighting parameter neural network of a lighting estimation neural network system. For instance, the standard image lighting parameter neural network can estimate LM lighting parameters. For instance, the LM lighting parameters can be extrapolated based on a latent representation generated by a standard image lighting parameter neural network. The LM lighting parameters can include sky color, sky turbidity, sun color, sun shape, and sun position. The LM lighting parameters can be represented using the following eleven parameters, as follows:

$$q_{LM}=\{w_{sky}, t, w_{sun}, \beta, \kappa, l_{sun}\}$$

At block 506, a LM sun model and a LM sky model can be applied using the estimated LM lighting parameters. Such a LM sun model can be based on: $q_{sun}=\{w_{sun},\beta,\kappa\}$ and such a LM sky model can be based on: $q_{sky}=\{w_{sky},t\}$ At block 508, training estimated render scenes can be rendered. For instance, the training estimated render scenes can be based on a basic three-dimensional scene to which lighting parameters can easily be applied (e.g., a scene of three spheres of with varying surface material properties). The training estimated render scene can be generated using a pre-computed transport matrix of a synthetic scene. Such rendered scenes can include a rendered scene based on LM sky parameters and a rendered scene based on estimated LM sun parameters. First, the rendered scene based on LM sky parameters can be generated by multiplying the transport matrix with a sky environmental map based on determined LM sky parameters (e.g., $Tf_{sky}(\tilde{q}_{sky})$). Second, the rendered scene based on LM sun parameters can be generated by multiplying the transport matrix a sun environmental map based on determined LM sun parameters (e.g., $Tf_{sun}(\tilde{q}_{sun})$).

Loss can be determined at block 510. First, loss can be based on sun position. Sun position can be based on azimuth and elevation. Azimuth can be the placement of the sun, left to right. Elevation can be the height of the sun, bottom to top. Azimuth and elevation can be represented using bins that have an associated pre-rendered lighting parameter scene. In an embodiment, the azimuth can be represented using 64 bins and elevation using 16 bins. Based on the estimated sun position, azimuth and elevation bins can be selected. Each bin can have an associated pre-rendered lighting parameters. KL-divergence loss can be used for determining loss related to sun position.

Other types of loss can be determined based on the LM sun and sky parameters (e.g., $w_{sky}$, t, $w_{sun}$, $\beta$, $\kappa$). Such losses can be represented, respectively, using the following equations:

$$\mathcal{L}_\beta=\|\hat{\beta}i-\tilde{\beta}\|_2$$

$$\mathcal{L}_\kappa=\|\hat{\kappa}-\tilde{\kappa}\|_2$$

$$\mathcal{L}_t=\|t-\tilde{t}\|_2$$

$$\mathcal{L}_{wn}=\|\hat{w}_{sun}-\tilde{w}_{sun}\|_2$$

$$\mathcal{L}_{wy}=\|\hat{w}_{sky}-\tilde{w}_{sky}\|_2$$

In such equations, the symbol (~) and (^) can denote network output and ground-truth and the, respectively. In particular, the estimated LM lighting parameters generated by the panoramic lighting parameter neural network can be used as ground-truth parameters. The determined LM scattering of the global scattering parameter generated by the standard image lighting parameter neural network (e.g., $\tilde{\beta}$) can compared to a corresponding ground-truth LM scattering of the global scattering parameter (e.g., $\hat{\beta}$) to calculate loss. The determined LM local scattering lighting parameter generated by the standard image lighting parameter neural network (e.g., $\tilde{\kappa}$) can compared to a corresponding ground-truth LM local scattering lighting parameter (e.g., $\hat{\kappa}$) to calculate loss. The determined LM turbidity lighting parameter generated by the standard image lighting parameter neural network (e.g., $\tilde{t}$) can compared to a corresponding ground-truth LM turbidity lighting parameter (e.g., $\hat{t}$) to calculate loss. In addition, the determined LM global scattering parameter generated by the standard image lighting parameter neural network (e.g., $\tilde{w}_{sun}$) can compared to a corresponding ground-truth LM global scattering parameter (e.g., ($\hat{w}_{sun}$) to calculate loss. The determined LM sky lighting parameter generated by the standard image lighting parameter neural network (e.g., $\tilde{w}_{sky}$) can compared to a corresponding ground-truth LM sky lighting parameter (e.g., $\hat{w}_{sky}$) to calculate loss.

Prior to computing loss for the above, each parameters can be normalized in the [0,1] interval according to minimum and maximum values in the training set. During training of the standard image lighting parameter neural network, the different types of loss can be weighted throughout training such that loss is emphasized (or deemphasized) at different times. For instance, during training, the weights can all be set to one except for $\mathcal{L}_\kappa$, $\mathcal{L}_\beta$, and $\mathcal{L}_{wn}$ which can be set to five, ten, and ten, respectively.

Further, additional render loss can be determined. In particular, the determined LM lighting parameters can be compared with the ground-truth lighting parameters by applying the lighting parameters to a scene to calculate loss. Render loss can be based on LM sky parameters and LM sun parameters. Such losses can be represented, respectively, using the following equations:

$$\mathcal{L}_{sky} = \|Tf_{sky}(\hat{q}_{sky}) - Tf_{sky}(\tilde{q}_{sky})\|_2$$

$$\mathcal{L}_{sun} = Tf_{sun}(\hat{q}_{sun}) - Tf_{sun}(\tilde{q}_{sun})\|_2$$

First, render loss based on LM sky parameters can be determined. In particular, a ground-truth rendered scene based on LM sky parameters can be generated by multiplying the transport matrix with a sky environmental map based on ground-truth LM sky parameters (e.g., $Tf_{sky}(\hat{q}_{sky})$). Such ground-truth LM sky parameters can be estimated using, for example, the panorama lighting parameter neural network. The rendered scene based on determined LM sky parameters can be generated by multiplying the transport matrix with a sky environmental map based on estimated LM sky parameters (e.g., $Tf_{sky}(\tilde{q}_{sky})$). Such loss can be computed using L2 loss.

Second, render loss based on LM sun parameters can be determined. In particular, a ground-truth rendered scene based on LM sun parameters can be generated by multiplying the transport matrix with a sun environmental map based on ground-truth LM sun parameters (e.g., $Tf_{sun}(\hat{q}_{sun})$). Such ground-truth LM sky parameters can be estimated using, for example, the panorama lighting parameter neural network. The rendered scene based on determined LM sun parameters can be generated by multiplying the transport matrix with a sun environmental map based on estimated LM sky parameters (e.g., $Tf_{sky}(\tilde{q}_{sky})$). Such loss can be computed using L2 loss.

During training of the standard image lighting parameter neural network, the render loss can be weighted throughout training. For instance, during training, the weights for the two render losses can each be set to one.

At block 512, loss determined at 510 can be used to adjust the standard image lighting parameter neural network. It should be appreciated additional types of loss can also be used to correct for errors in the network. Errors determined using loss functions are used to minimize loss in the standard image lighting parameter neural network by backwards propagation of such errors through the system. As indicated in FIG. 5, blocks 502 through 512 may be repeated any number of times to train the neural network system.

Figure 6:
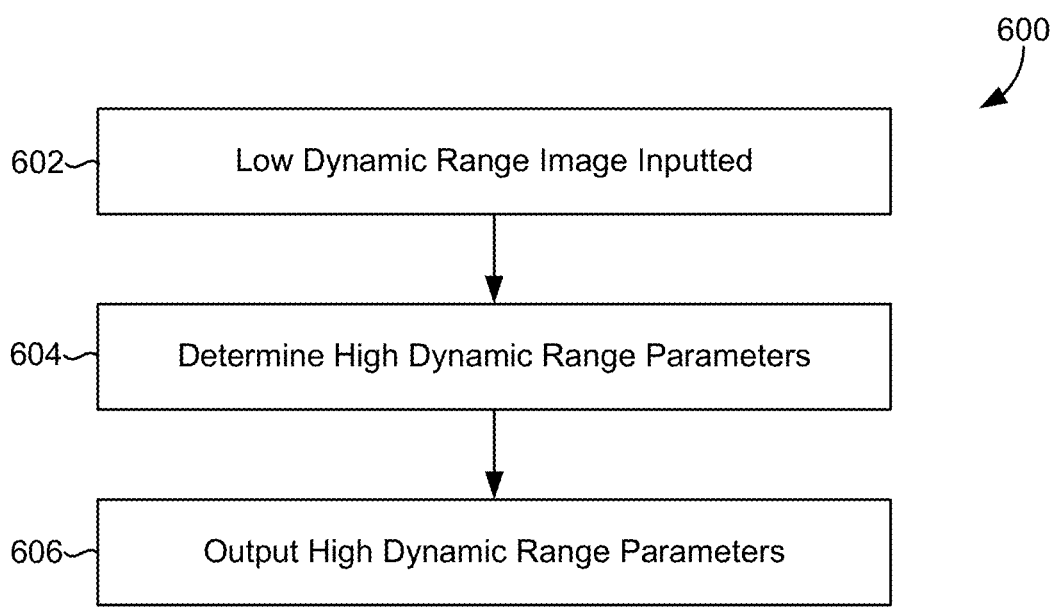
FIG. 6 depicts a process flow showing an embodiment for using a trained lighting estimation neural network system to estimate HDR lighting parameters from a LDR image, in accordance with embodiments of the present disclosure.

FIG. 6 provides a process flow showing an embodiment of method 600 for using a trained lighting estimation neural network system to estimate HDR lighting parameters from a LDR image, in accordance with embodiments of the present disclosure. Method 600 can be performed, for example by lighting estimation system 204, as illustrated in FIG. 2.

At block 602, a LDR image can be input into a trained lighting estimation neural network system (e.g., such as a system trained as described with reference to FIGS. 3-5). The image can be input by a user taking a picture using a camera on a device and/or providing a URL to an image, for example. The image can be a panorama or a standard image. At block 604, the trained lighting estimation neural network system can estimate HDR lighting parameters for the input LDR image. The estimated HDR parameters can be output at block 606. Such estimated HDR parameters can be LM lighting parameters that include sky color, sky turbidity, sun color, sun shape, and sun position. These output parameters can be displayed to a user on a user device, for example, on user devices 102a-102n and/or user device 114. Such a user device can be a computing device, such as computing device 900 further described with reference to FIG. 9. Additionally, a user can interact with such output parameters, for example, by selecting to apply the LM lighting parameters to an object placed into the image.

Figure 7:
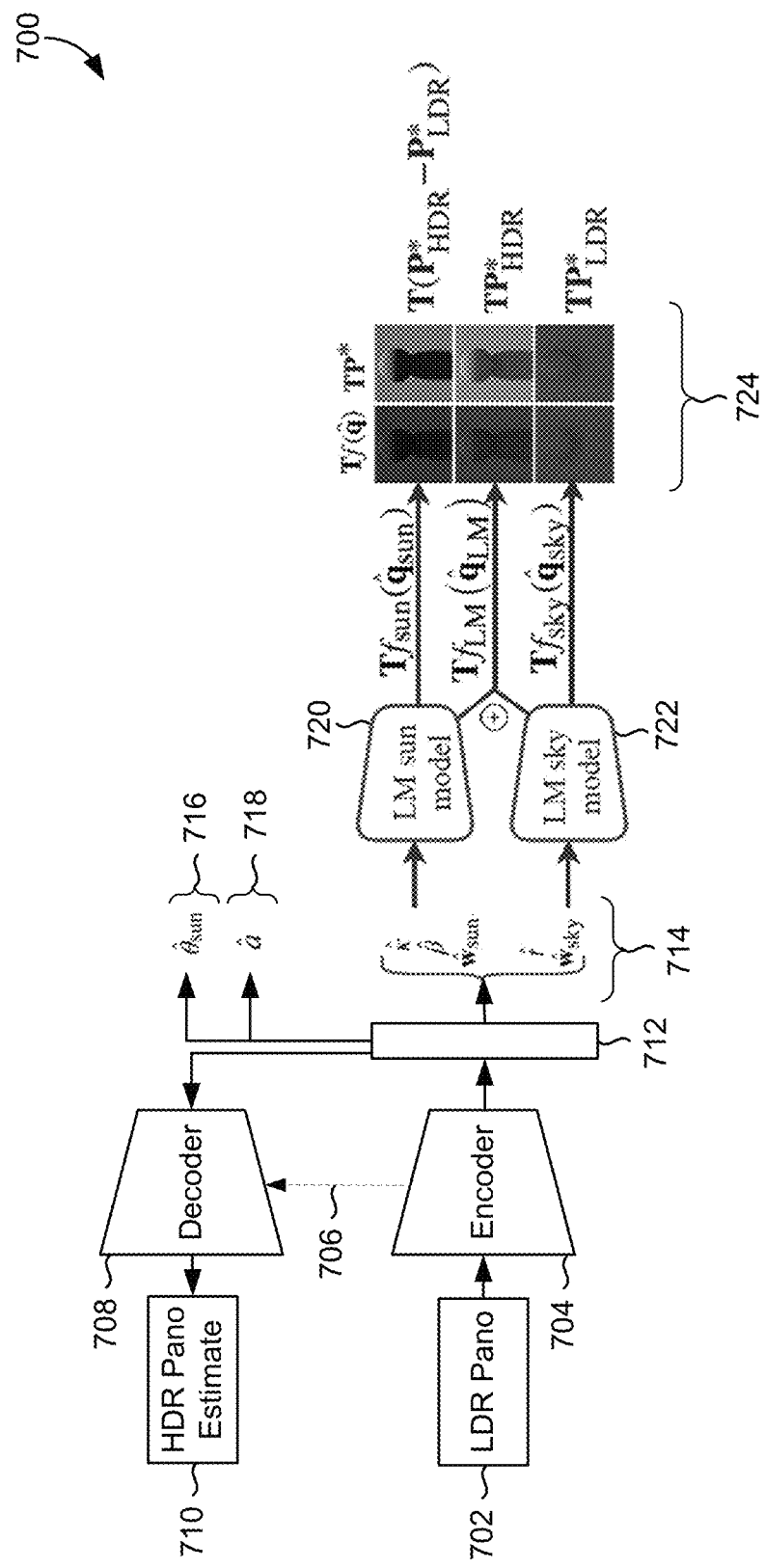
FIG. 7 depicts an example environment that can be used for a panorama lighting parameter neural network to estimate HDR parameters, in accordance with embodiments of the present disclosure.

FIG. 7 illustrates an example environment 700 that can be used for a panorama lighting parameter neural network to estimate HDR parameters, in accordance with embodiments of the present disclosure. Training a panorama lighting parameter neural network can be performed using, for example, a convolutional neural network. Specifically, the architecture can contain a number of convolutional layers. After the convolutional layers, the network can have one or more fully connected layers that produce one or more latent representations.

In particular, the convolutional neural network can receive an input LDR panorama image 702. From the input LDR panorama image 702, the convolutional neural network can use an encoder 704 with skip-links 706 to regress a HDR panorama 710 estimate from the input LDR panorama image 702. In this regression, an equirectangular format can be used with the assumption such that the panorama is rotated such that the sun is in the center. In particular, decoder 708 can construct HDR panorama 710 from input LDR panorama image 702 and a latent representation (e.g., latent vector z) from layer 712.

The convolutional neural network can have another path from a latent vector from layer 712 to two fully connected layers that can estimate the sun elevation 716 for the input LDR panorama image 702.

Another path from the latent vector from layer 712 can connect to an unsupervised domain adaptation branch 718. This domain adaptation branch takes the latent vector (e.g., representation) and passes it through a fully connected layer to perform a binary classification (e.g., real/fake input image). The binary classification can be evaluated for any errors in the network. Such errors can be determined by finding cross-entropy loss.

A further path from the latent vector from layer 712 can be added that predicts LM lighting parameters 714. In this way, the network can learn to estimate the sun and sky colors, the sun shape, and the sky turbidity. For instance, the trained convolutional neural network can generate a latent vector from layer 712 that can be used to extrapolate the LM lighting parameters 714. This path can have a structure of two consecutive FC layers with a size of 512 and 25 neurons where the output layer has 9 neurons corresponding to the nine LM sky parameters.

During iterations the neural network is undergoing training, LM lighting parameters 714 can be used to drive LM sun model 720 and LM sky model 722. In particular, the LM lighting parameters 714 can be used to generate sun and sky environment maps that can be used to render an object using a pre-computed transport matrix (e.g., T) to generate rendered scenes 724. Rendered scenes 724 can be used to determine loss in the network (e.g., as discussed with reference to FIG. 4). As depicted, such rendered scenes 724 are a basic three-dimensional scene of a sphere on a surface to which lighting parameters are applied. In this way, rendered scenes 724 reflect LM lighting parameters 714 applied to the three-dimensional scene of the sphere on the surface.

The loss in the network can be fed back though the network to decrease the loss in further iterations. In an embodiment, for training the panorama lighting parameter neural network, the ADAM optimizer can be used with a minibatch size of 80 and an initial learning rate of 0.001. Each minibatch can contain 36 synthetic HDR panoramas (e.g., 45%), 4 captured panoramas (e.g., 5%), 4 HDRI Haven panoramas (e.g., 5%), 4 Google Street View images (e.g., 5%), and 32 SUN360 LDR panoramas (e.g., 40%). Iterations of training can be repeated for a sufficiently large number of training cycles. For example, training can be repeated for 500 epochs. As another example, trailing can be repeated until the neural network system converges to a desired state (e.g., where errors fall below a predetermined threshold) such that the output produced reaches a desired threshold minimum of loss.

The neural network system can have previously been trained in a manner as described in reference to method 400 in FIG. 4. Upon conclusion of the training process, the trained neural network can be used determine HDR lighting properties for input LDR panorama images.

Figure 8:
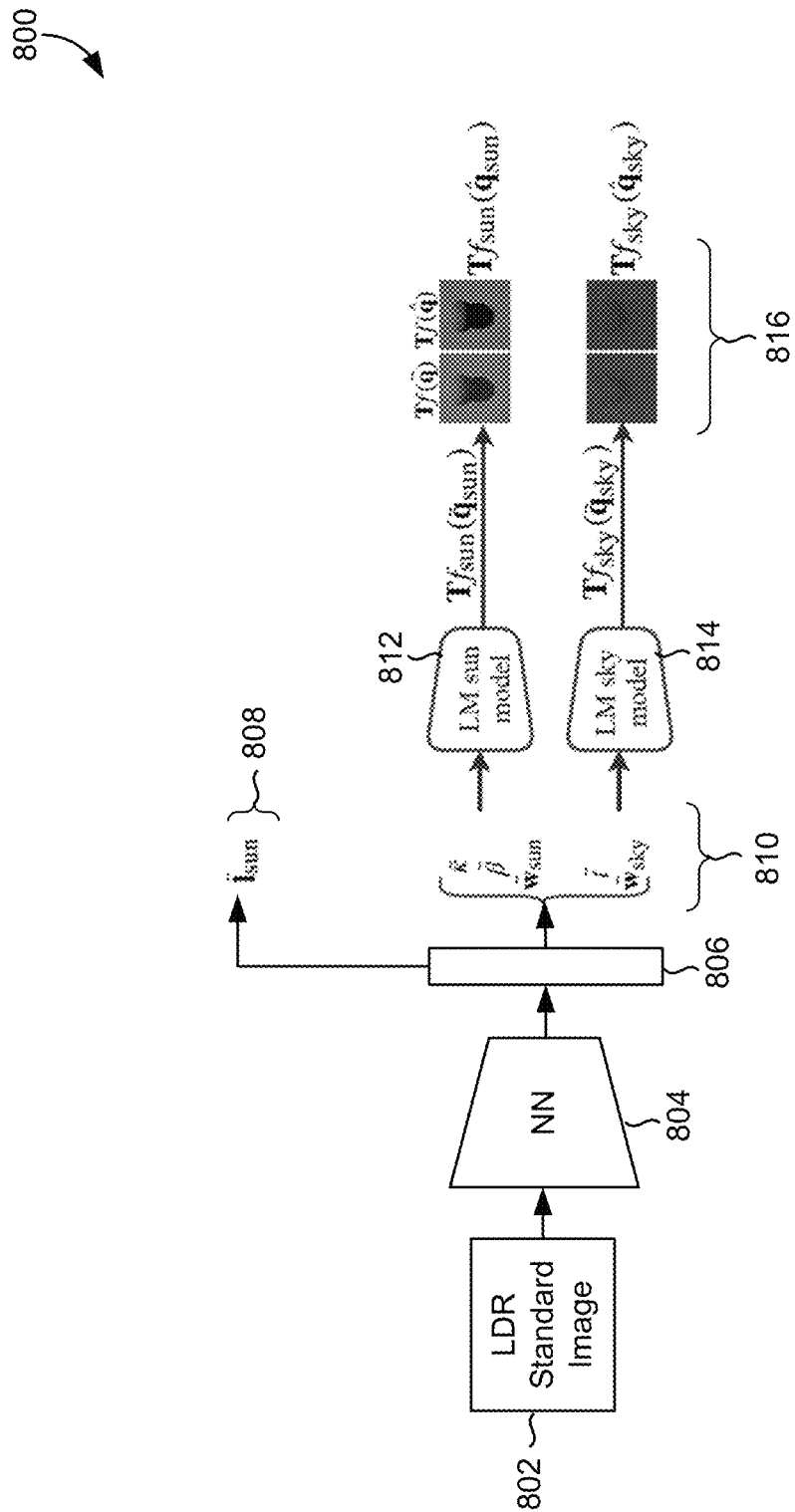
FIG. 8 illustrates an example environment that can be used for a standard lighting parameter neural network to estimate HDR parameters, in accordance with embodiments of the present disclosure.

FIG. 8 illustrates an example environment 800 that can be used for a standard lighting parameter neural network to estimate HDR parameters, in accordance with embodiments of the present disclosure. Training a standard lighting parameter neural network can be performed using, for example, a convolutional neural network. Specifically, the architecture can contain a number of convolutional layers. After the convolutional layers, the network can have one or more fully connected layers that produce one or more latent representations.

In particular, the convolutional neural network can receive an input LDR standard image 802. The standard image lighting parameter neural network 804 estimates the LM lighting parameters from the standard LDR image. The architecture of the standard image lighting parameter neural network 804 can be comprised of five convolutional layers, followed by two consecutive FC layers. Each convolutional layer can be followed by a sub-sampling step, batch normalization, and an ELU activation function on all the convolutional layers.

Layer 806 can have a sun position branch can output a probability distribution over a discretized sun position (e.g., $l_{sun}$). Azimuth and elevation bins based on of the sun position 808 can be used to determine loss in the network (e.g., as discussed with reference to FIG. 5).

A path from the latent vector from layer 806 can be added that predicts LM lighting parameters 810. In this way, the network can learn to estimate the sun and sky color, the sun shape, and the sky turbidity. During iterations where convolutional neural network has completed training, the network can generate a latent vector from layer 806 that can be used to extrapolate the LM lighting parameters 810. During iterations the neural network is undergoing training, LM lighting parameters 810 can be used to drive LM sun model 812 and LM sky model 814. In particular, the LM lighting parameters 810 can be used to generate sun and sky environment maps that can be used to render an object using a pre-computed transport matrix (e.g., T) to generate rendered scenes 816. Rendered scenes 816 can be used to determine loss in the network (e.g., as discussed with reference to FIG. 5). As depicted, such rendered scenes 816 are a basic three-dimensional scene of a sphere on a surface to which lighting parameters are applied. In this way, rendered scenes 816 reflect LM lighting parameters 810 applied to the three-dimensional scene of the sphere on the surface.

The loss in the network can be fed back though the network to decrease the loss in further iterations. In an embodiment, for training the standard image lighting parameter neural network, the ADAM optimizer can be used with a minibatch size of 256 and an initial learning rate of 0.001. Each minibatch can contain 239 standard images taken from SUN360 LDR panoramas (e.g., 90%) and 26 standard images taken from captured panoramas (e.g., 10%). Iterations of training can be repeated for a sufficiently large number of training cycles. For example, training can be repeated for 500 epochs. As another example, trailing can be repeated until the neural network system converges to a desired state (e.g., where errors fall below a predetermined threshold) such that the output produced reaches a desired threshold minimum of loss.

The neural network system can have previously been trained in a manner as described in reference to method 500 in FIG. 5. Upon conclusion of the training process, the trained neural network can be used determine HDR lighting properties for input LDR standard images.

Figure 9:
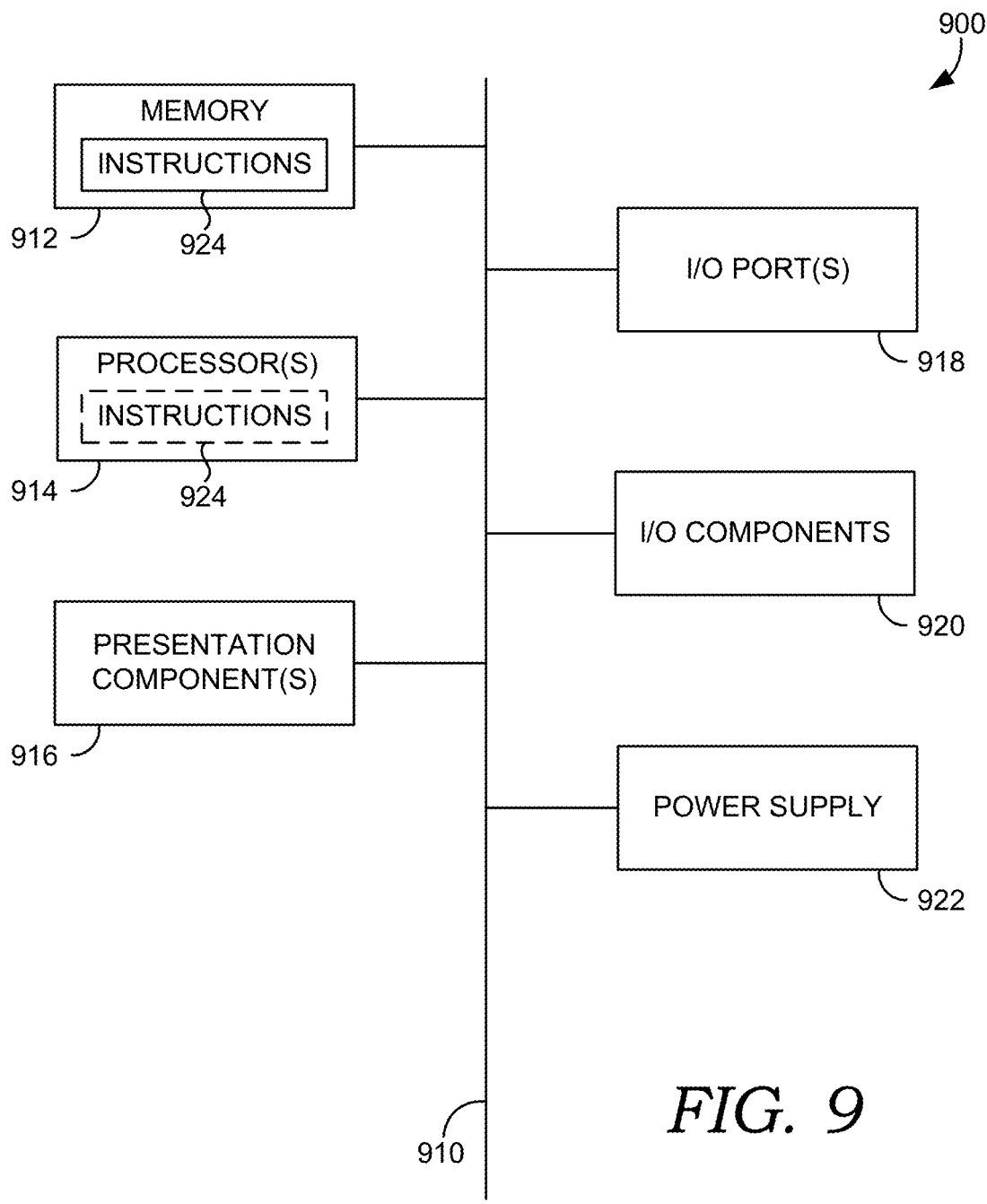
FIG. 9 is a block diagram of an example computing device in which embodiments of the present disclosure may be employed.

Having described embodiments of the present disclosure, FIG. 9 provides an example of a computing device in which embodiments of the present disclosure may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for determining high-dynamic range ("HDR") lighting parameters for a low-dynamic range ("LDR") image, the method comprising:
   receiving, by a neural network system, a LDR panorama image;
   estimating HDR lighting parameters for the LDR panorama image, wherein the HDR lighting parameters are extrapolated from a latent representation generated from the LDR panorama image by a panoramic lighting parameter neural network of the neural network system, wherein the HDR lighting parameters are based on at least one of sky color, sky turbidity, sun color, sun shape, and sun position; and
   outputting, based on the estimated HDR lighting parameters from the panoramic lighting parameter neural network, substantially accurate HDR lighting parameters for the LDR panorama image.

2. The computer-implemented method of claim 1, further comprising:
   applying the substantially accurate HDR lighting parameters to an object added to the LDR panorama image.

3. The computer-implemented method of claim 1, further comprising:
   providing the substantially accurate HDR lighting parameters to a user device, wherein the substantially accurate HDR lighting parameters are provided as one of the substantially accurate HDR lighting parameters or as the substantially accurate HDR lighting parameters applied to an object added to the LDR panorama image.

4. The computer-implemented method of claim 1, further comprising:
   training the panoramic lighting parameter neural network, wherein the training is based on loss including at least one of panorama loss, sun elevation loss, panorama render loss, domain adaptation loss, sun parameter render loss, and sky parameter render loss.

5. The computer-implemented method of claim 1, further comprising:

using the substantially accurate HDR lighting parameters as ground-truth lighting parameters to train a standard image lighting parameter neural network of the neural network system.

6. The computer-implemented method of claim 5, wherein the standard image lighting parameter neural network is trained using loss based on at least one of the sky color, the sky turbidity, the sun color, the sun shape, and the sun position, sun parameter render loss, and sky parameter render loss.

7. The computer-implemented method of claim 5, further comprising:
receiving, by the neural network system, a LDR standard image;
determining, using the neural network system, estimated HDR lighting parameters for the LDR standard image, wherein the estimated HDR lighting parameters are based on the ground-truth lighting parameters; and
outputting the estimated HDR lighting parameters.

8. The computer-implemented method of claim 7, further comprising:
applying the estimated HDR lighting parameters to an object added to the LDR standard image.

9. The computer-implemented method of claim 7, further comprising:
providing the estimated HDR lighting parameters to a user device, wherein the estimated HDR lighting parameters are provided as one of the estimated HDR lighting parameters or as the estimated HDR lighting parameters applied to an object added to the LDR standard image.

10. One or more non-transitory computer-readable media having a plurality of executable instructions embodied thereon, which, when executed by one or more processors, cause the one or more processors to perform steps comprising:
receiving, by a neural network system, a LDR image;
generating a latent representation using the neural network system;
estimating, by the neural network system, HDR lighting parameters for the LDR image, wherein the HDR lighting parameters are estimated from the latent representation generated by the neural network system, wherein the HDR lighting parameters are based on at least one of sky color, sky turbidity, sun color, sun shape, and sun position; and
outputting, based on the estimated HDR lighting parameters, substantially accurate HDR lighting parameters for an LDR panorama image.

11. The media of claim 10, wherein the LDR image is one of a LDR panorama image or a LDR standard image.

12. The media of claim 10, the steps further comprising:
applying the substantially accurate HDR lighting parameters to an object added to the LDR image.

13. The media of claim 10, the steps further comprising:
providing the substantially accurate HDR lighting parameters to a user device, wherein the substantially accurate HDR lighting parameters are provided as one of the substantially accurate HDR lighting parameters or as the substantially accurate HDR lighting parameters applied to an object added to the LDR image.

14. The media of claim 10, the steps further comprising:
training a panoramic lighting parameter neural network of the neural network system, wherein the training is based on loss including panorama loss, sun elevation loss, panorama render loss, domain adaptation loss, sun parameter render loss, and sky parameter render loss.

15. The media of claim 14, the steps further comprising:
using the trained panoramic lighting parameter neural network to estimate the HDR lighting parameters;
applying the HDR lighting parameters as ground-truth lighting parameters to train a standard image lighting parameter neural network of the neural network system.

16. The media of claim 15, wherein the standard image lighting parameter neural network is trained based on the loss.

17. A computing system comprising:
means for estimating HDR lighting parameters for an LDR image, wherein the HDR lighting parameters are estimated based on a latent representation generated from the LDR image, wherein the HDR lighting parameters are based on sky color, sky turbidity, sun color, sun shape, and sun position; and
means for outputting substantially accurate HDR lighting parameters for the LDR image based on the estimated HDR lighting parameters.

18. The computing system of claim 17, wherein the LDR image is a LDR panorama image and the HDR lighting parameters are estimated using a panoramic lighting parameter neural network.

19. The computing system of claim 17, wherein the LDR image is a LDR standard image and the HDR lighting parameters are estimated using a standard image lighting parameter neural network.

20. The computing system of claim 17, further comprising:
means for applying the substantially accurate HDR lighting parameters to an object added to the LDR image.

* * * * *